United States Patent
Hyllander et al.

(10) Patent No.: US 8,126,070 B2
(45) Date of Patent: Feb. 28, 2012

(54) METHOD AND BASE STATION FOR ORTHOGONAL FREQUENCY DIVISION MULTIPLEXING (OFDM) SIGNAL PROCESSING

(75) Inventors: Thord Hyllander, Solna (SE); Leonard Rexberg, Hässelby (SE); Jacob Österling, Järfälla (SE); Vimar Björk, Göteborg (SE); Tore Mikael André, Älvsjö (SE); Torbjörn Gunnar Widhe, Mölndal (SE); Daniel Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 664 days.

(21) Appl. No.: 12/325,501

(22) Filed: Dec. 1, 2008

(65) Prior Publication Data
US 2010/0074349 A1    Mar. 25, 2010

Related U.S. Application Data

(60) Provisional application No. 61/099,992, filed on Sep. 25, 2008.

(51) Int. Cl.
*H04K 1/10* (2006.01)
(52) U.S. Cl. ........ 375/260; 375/130; 375/344; 375/147; 370/329; 370/209; 370/321
(58) Field of Classification Search .................. 375/260, 375/130, 147, 344; 370/329, 209, 321
See application file for complete search history.

(56) References Cited

U.S. PATENT DOCUMENTS

| | | | |
|---|---|---|---|
| 7,333,528 B1 | 2/2008 | Miao | |
| 7,471,932 B2 * | 12/2008 | Wu et al. | 455/91 |
| 2004/0005010 A1 * | 1/2004 | He et al. | 375/260 |
| 2007/0133702 A1 * | 6/2007 | Chun et al. | 375/260 |
| 2010/0220819 A1 * | 9/2010 | Li et al. | 375/344 |
| 2010/0329203 A1 * | 12/2010 | Lee et al. | 370/329 |
| 2011/0142094 A1 * | 6/2011 | Pan et al. | 375/130 |

\* cited by examiner

*Primary Examiner* — Eva Puente

(57) ABSTRACT

A method and base station for forming an OFDM signal from a baseband signal includes a partitioning unit configured to partition a block of baseband signal samples into sub-blocks. A sub-carrier mapper maps the sub-blocks onto adjacent sub-carrier blocks of an OFDM multi-carrier to form corresponding unprefixed OFDM symbols. A cyclic prefix adder adds a cyclic prefix to each mapped sub-block to form prefixed OFDM symbols. Phase compensations force the unprefixed OFDM symbol part of all subsequently up-converted prefixed OFDM symbols to start at the same phase. Up-converters up-convert the phase compensated prefixed OFDM symbols to respective radio frequency bands having center frequencies and bandwidths that preserve the OFDM multi-carrier structure. A combiner combines the up-converted phase compensated prefixed OFDM symbols into an OFDM signal.

22 Claims, 18 Drawing Sheets dance with the present invention for forming an OFDM signal
METHOD AND BASE STATION FOR ORTHOGONAL FREQUENCY DIVISION MULTIPLEXING (OFDM) SIGNAL PROCESSING

CROSS-REFERENCE TO RELATED APPLICATIONS

This application claims the benefit of U.S. Provisional Application No. 61/099,992, filed Sep. 25, 2008, the disclosure of which is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to generally to radio communications. More particularly, and not by way of limitation, the present invention is directed to a base station and method for Orthogonal Frequency Division Multiplexing (OFDM) signal processing by forming OFDM signals from baseband signals and vice versa.

A list of abbreviations utilized herein is provided at the end of the specification.

The current state of the art radio in mobile communication is the WCDMA radio unit. Each WCDMA carrier is about 5 MHz wide, and the state of the art radios can send up to 4 such carriers within a 20 MHz bandwidth. The basic principles are illustrated by the base station in FIG. 1. Four input signal sample streams are forwarded to respective spreaders 10 and the spread signals are forwarded to respective radio units 12. The output signals are combined in adders 14 to form the 20 MHz output signal to be transmitted from the base station.

LTE, which is not based on WCDMA but on OFDM/OFDMA, will require transmission in bandwidths up to 20 MHz. The basic principles are illustrated by the base station in FIG. 2. A single input sample stream is for-warded to a serial/parallel converter 20, the output of which is processed by an IDFT block 22, typically implemented as an IFFT block. A cyclic prefix adder 24 adds a cyclic prefix to the output signal from IDFT block 22, and the resulting signal is forwarded to a radio unit 12 for transmission.

SUMMARY

An object of the present invention is a new approach of forming an OFDM signal from a baseband signal.

Another object of the present invention is a new approach of forming a base-band signal from an OFDM signal.

In an embodiment of the present invention, an OFDM signal is formed from a baseband signal in a procedure that starts by partitioning a block of baseband signal samples into sub-blocks. The sub-blocks are mapped onto adjacent sub-carrier blocks of an OFDM multi-carrier. Each mapped sub-block is transformed into a corresponding un-prefixed OFDM symbol. A cyclic prefix is added to each mapped sub-block to form prefixed OFDM symbols. Phase compensations are performed to force the un-prefixed OFDM symbol part of all prefixed OFDM symbols to start at the same phase after subsequent up-conversion to radio frequency. The phase compensated prefixed OFDM symbols are up-converted to respective radio frequency bands having center frequencies and bandwidths that preserve the OFDM multi-carrier structure. The up-converted phase compensated prefixed OFDM symbols are combined into an OFDM signal.

A baseband signal may be formed from an OFDM signal in a procedure that starts by down-converting partially overlapping radio frequency bands of the OFDM signal to corresponding prefixed OFDM symbols. A cyclic prefix is removed from each down-converted prefixed OFDM symbol to form un-prefixed OFDM symbols. The un-prefixed OFDM symbols are transformed into base-band sub-blocks mapped to adjacent OFDM sub-carrier blocks. The baseband sub-blocks are de-mapped from the adjacent OFDM sub-carrier blocks. Phase compensations are performed after down-conversion so that the de-mapped baseband sub-blocks will correspond to unprefixed OFDM symbols that start at the same phase. The phase compensated de-mapped baseband sub-blocks are combined into a baseband signal.

LTE transmissions with bandwidths up to 20 MHz would normally require the development of a new digital solution for the radio. Since the market is very sensitive to the cost and size of the radio unit, the digital solution would have to be implemented as an ASIC, giving both a high degree of technical risk (as always for ASICs) and a long lead time. An advantage of the present invention is that it enables reuse of WCDMA radio ASICs, which is very beneficial from a cost perspective and from a lead time perspective.

Another advantage of the present invention is that it enables selective or simultaneous use of WCDMA or LTE through the same radio equipment, using different parts of the spectrum.

BRIEF DESCRIPTION OF THE SEVERAL VIEWS OF THE DRAWING

The invention, together with further objects and advantages thereof, may best be understood by making reference to the following description taken together with the accompanying drawings, in which.

DETAILED DESCRIPTION

In the following description the same reference designations will be used for elements that perform the same or similar functions.

Figure 1:
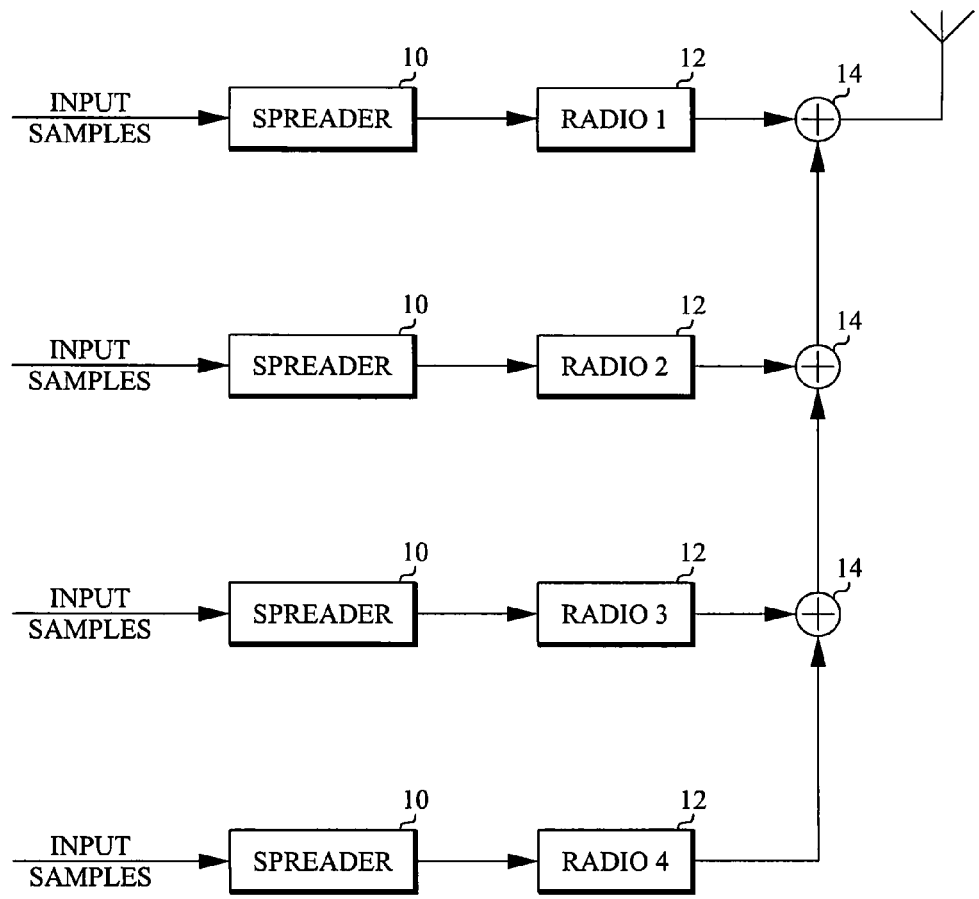
FIG. 1 is a block diagram illustrating the basic principles of a state of the art WCDMA base station.
Figure 3:
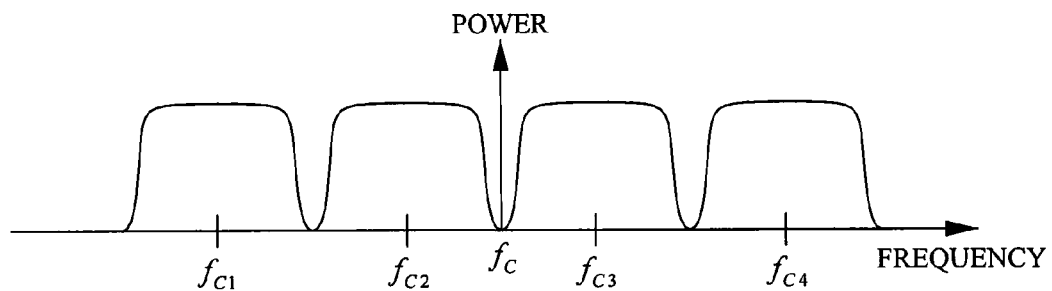
FIG. 3 is a diagram illustrating the power spectrum of the downlink of a WCDMA system of the type described with reference to FIG. 1.

FIG. 3 is a diagram illustrating the power spectrum of the downlink of a WCDMA system of the type described with reference to FIG. 1. In this example the power spectrum consists of 4 separated frequency bands having center frequencies $f_{1C} K f_{4C}$. The center frequency of the composite signal containing all 4 frequency bands is denoted $f_C$.

Figure 2:
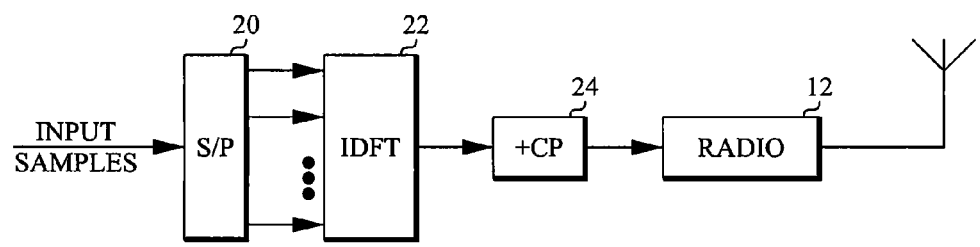
FIG. 2 is a block diagram illustrating the basic principles of a state of the art LTE (OFDM) base station.
Figure 4:
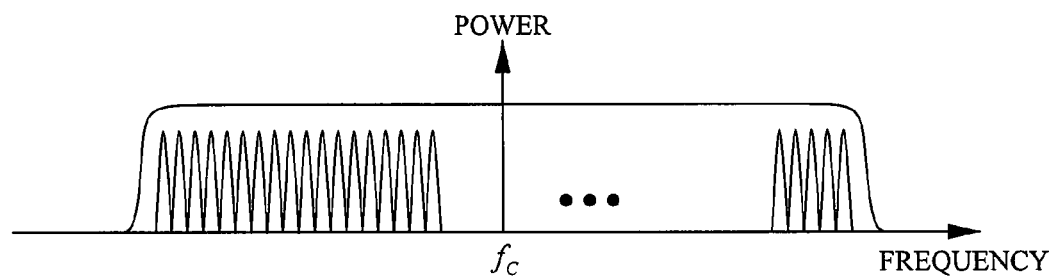
FIG. 4 is a diagram illustrating the power spectrum of the downlink of an OFDM system of the type described with reference to FIG. 2.

FIG. 4 is a diagram illustrating the power spectrum of the downlink of an OFDM system of the type described with reference to FIG. 2. This spectrum has the same total bandwidth and center frequency $f_C$ as the power spectrum in FIG. 3, but is contiguous. The OFDM subcarrier structure is indicated.

Figure 5:
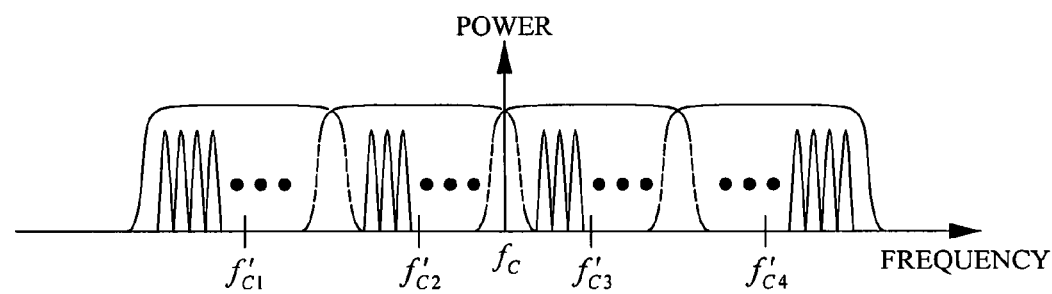
FIG. 5 is a diagram illustrating an example of the power spectrum of the downlink of an OFDM system in accordance with the present invention.

FIG. 5 is a diagram illustrating an example of the power spectrum of the downlink of an OFDM system in accordance with the present invention. It is formed by slightly expanding the bandwidths of the separate bands in FIG. 3 to obtain overlapping bands, and by slightly shifting the center frequencies from $f_{1C} K f_{4C}$ to $f'_{1C} K f'_{4C}$ to maintain the same total bandwidth as in FIG. 4. The center frequencies $f'_{1C} K f'_{4C}$ and bandwidths are chosen in such a way that the OFDM subcarriers are uniformly distributed as in the pure OFDM spectrum illustrated in FIG. 4.

Assuming a total bandwidth of 20 MHz and conveying an LTE signal, the following values may be used:

$f'_{1C} = -6.75$ MHz $f'_{2C} = -2.25$ MHz $f'_{3C} = 2.265$ MHz $f'_{4C} = 6.765$ MHz

Each band has 300 OFDM subcarriers of 15 kHz. Note that the 15 kHz offset in $f'_{3C}$ and $f'_{4C}$ is due to the intentional lack of signal in the center OFDM subcarrier.

In the example illustrated in FIG. 5 there are 4 overlapping frequency bands that all have the same bandwidth. This example will be used to describe the invention. However, the principles described below are equally applicable to other cases. Thus, there may be both fewer and more frequency bands.

Figure 6:
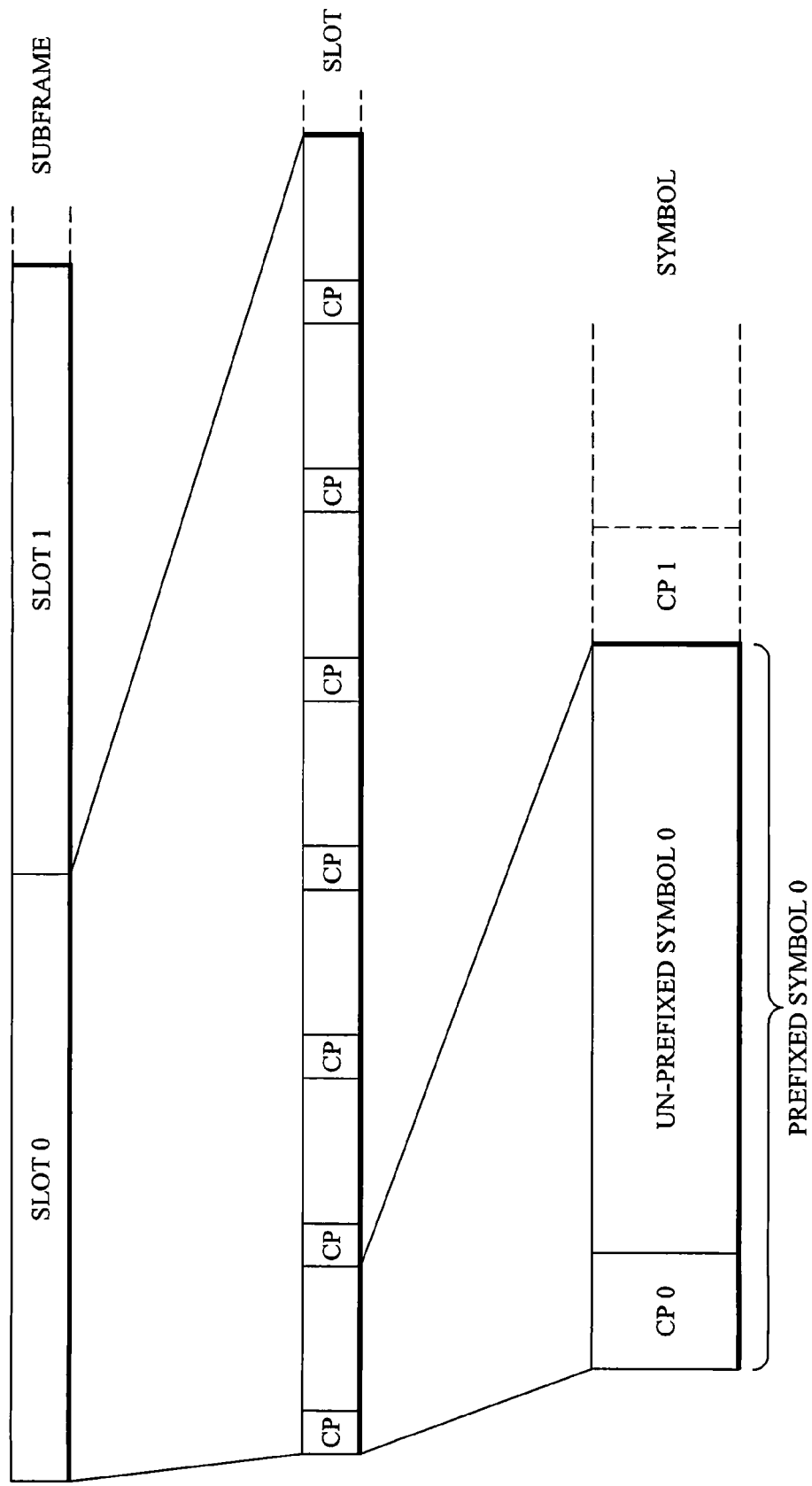
FIG. 6 is a diagram conceptually illustrating an example of the sub-frame structure of an LTE downlink.

FIG. 6 is a diagram illustrating an example of the subframe structure of an LTE downlink. Each subframe (having a duration of 1 ms) is divided into 2 slots. Each slot comprises 7 prefixed OFDM symbols. Each prefixed OFDM symbol comprises an un-prefixed OFDM symbol, which contains the actual useful information, and a cyclic prefix, which repeats the end of the un-prefixed OFDM symbol.

Figure 7:
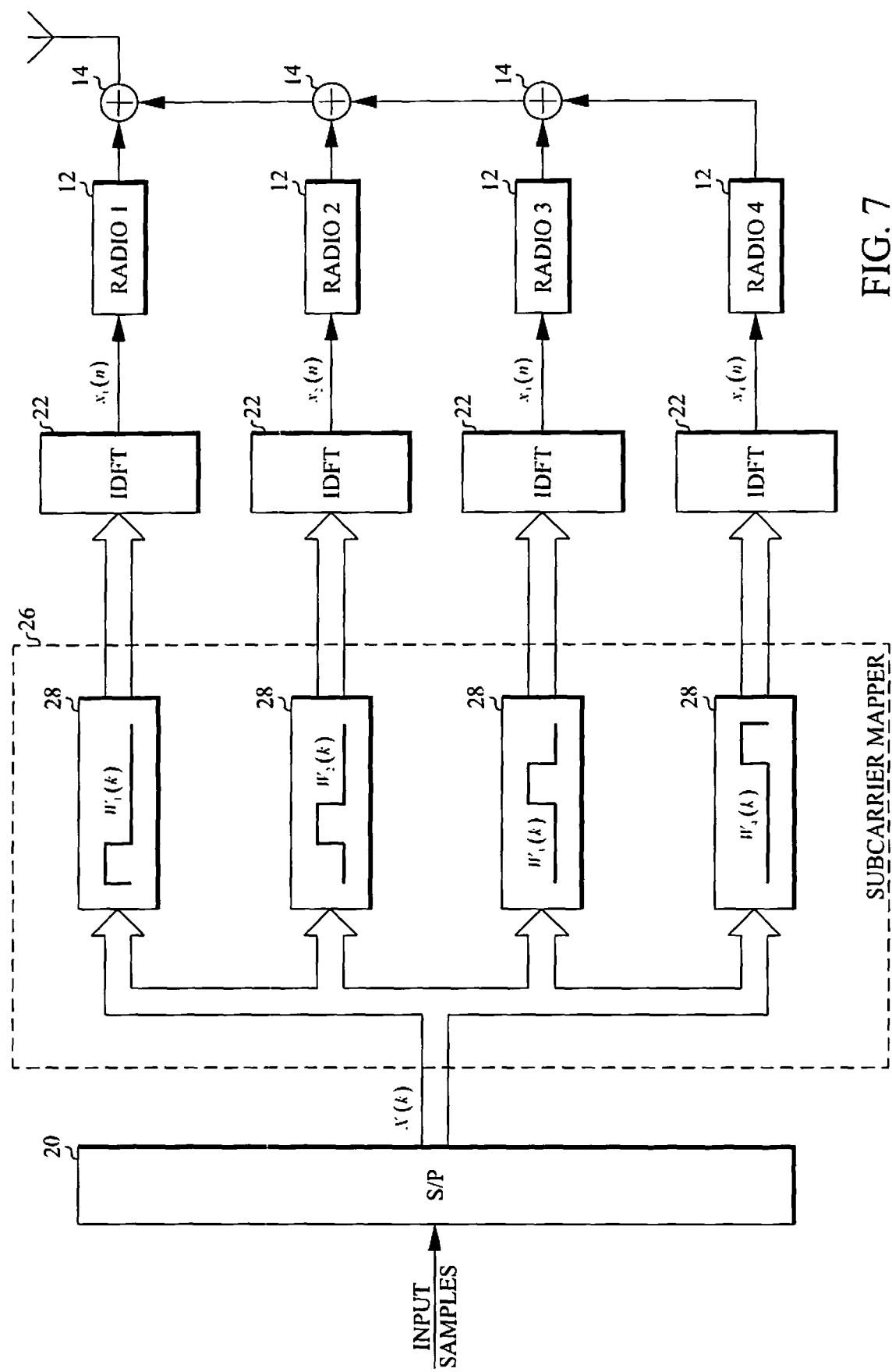
FIG. 7 is a block diagram illustrating a first step towards the present invention.

FIG. 7 is a block diagram conceptually illustrating a first step towards the present invention. The (frequency domain) samples X(k) are forwarded to a subcarrier mapper 26. Subcarrier mapper 26 includes rectangular frequency windows 28, one for each radio unit. The first window is defined by:

$$W_1(k) = \begin{cases} 1, & k = 0 K \ N/4 - 1 \\ 0, & \text{otherwise} \end{cases} \quad (1)$$

Multiplying the input samples X(k) by $W_1(k)$ amounts to extracting the first N/4 samples of X(k) and zero padding up to the full length N. Performing the IDFT in block 22 gives:

$$\begin{aligned} x_1(n) &= \frac{1}{N} \sum_{k=0}^{N-1} X(k) W_1(k) e^{\frac{j2\pi \cdot k \cdot n}{N}} \\ &= \frac{1}{N} \sum_{k=0}^{N/4-1} X(k) e^{\frac{j2\pi \cdot k \cdot n}{N}}, \end{aligned} \quad (2)$$

$n = 0 K \ N - 1$

Thus, the un-prefixed symbol $x_1(n)$ after the IDFT represents the interpolated version of the IDFT of the first N/4 samples of X(k).

The second window is defined by:

$$W_2(k) = \begin{cases} 0, & k = 0 \ldots N/4 - 1 \\ 1, & k = N/4 \ldots N/2 - 1 \\ 0, & \text{otherwise} \end{cases} \quad (3)$$

Multiplying the input samples X(k) by $W_1(k)$ and performing the IDFT in block 22 gives:

$$x_2(n) = \frac{1}{N} \sum_{k=0}^{N-1} X(k) W_2(k) e^{j\frac{2\pi \cdot k \cdot n}{N}} \quad (4)$$

$$= \frac{1}{N} \sum_{k=N/4}^{N/2-1} X(k) e^{j\frac{2\pi \cdot k \cdot n}{N}},$$

$$n = 0 \ldots N - 1$$

By changing summation variable to m=k−N/4 this can be rewritten as:

$$x_2(n) = \frac{1}{N} \sum_{m=0}^{N/4-1} X(m + N/4) e^{j\frac{2\pi \cdot (k + N/4) \cdot n}{N}} \quad (5)$$

$$= e^{j\frac{\pi \cdot n}{2}} \cdot \frac{1}{N} \sum_{m=0}^{N/4-1} X(m + N/4) e^{j\frac{2\pi \cdot m \cdot n}{N}},$$

$$n = 0 \ldots N - 1$$

Thus, the un-prefixed symbol $x_2(n)$ after the IDFT represents the interpolated version of the IDFT of samples N/4 to N/2−1 of X(k) modulated by $$e^{j\frac{\pi \cdot n}{2}}.$$

Similar calculations for the un-prefixed symbols $x_3(n)$ and $x_4(n)$ give:

$$x_3(n) = e^{j\pi \cdot n} \cdot \frac{1}{N} \sum_{m=0}^{N/4-1} X(m + N/2) e^{j\frac{2\pi \cdot m \cdot n}{N}}, \quad (6)$$

$$n = 0 \ldots N - 1$$

$$x_4(n) = e^{j\frac{3\pi \cdot n}{2}} \cdot \frac{1}{N} \sum_{n=0}^{N/4-1} X(m + 3N/4) e^{j\frac{2\pi \cdot m \cdot n}{N}},$$

$$n = 0 \ldots N - 1$$

In general the modulating function may be written as:

$$M(n, \text{Offset}) = e^{j\frac{2\pi \cdot \text{Offset} \cdot n}{N}} \quad (7)$$

where Offset is the offset (number of frequency bins) of the window from zero frequency. Since M(0,Offset)=1, the modulating function always has the phase zero at the beginning of an un-prefixed symbol regardless of the value of Offset.

Returning to FIG. 7, the un-prefixed symbols $x_1(n) \ldots x_4(n)$ are forwarded to respective radio units 12 for up-conversion to RF. The signals from radio units 12 are combined in adders 14. The combined signal is amplified and transmitted.

The arrangement in FIG. 7 would actually work if the up-conversion frequencies $f_{1C} \ldots f_{4C}$ and bandwidths were properly selected, as discussed with reference to FIG. 5. This would give an OFDM wideband signal without prefixes. Since the OFDM subcarrier structure has to be preserved by the up-conversion, the frequency differences, for example $f_{2C} - f_{1C}$, have to correspond to an integer number of subcarrier spacings, otherwise the subcarriers in FIG. 5 would be non-uniformly distributed, which would destroy the OFDM structure. This difference corresponds to the value of Offset.

Figure 8:
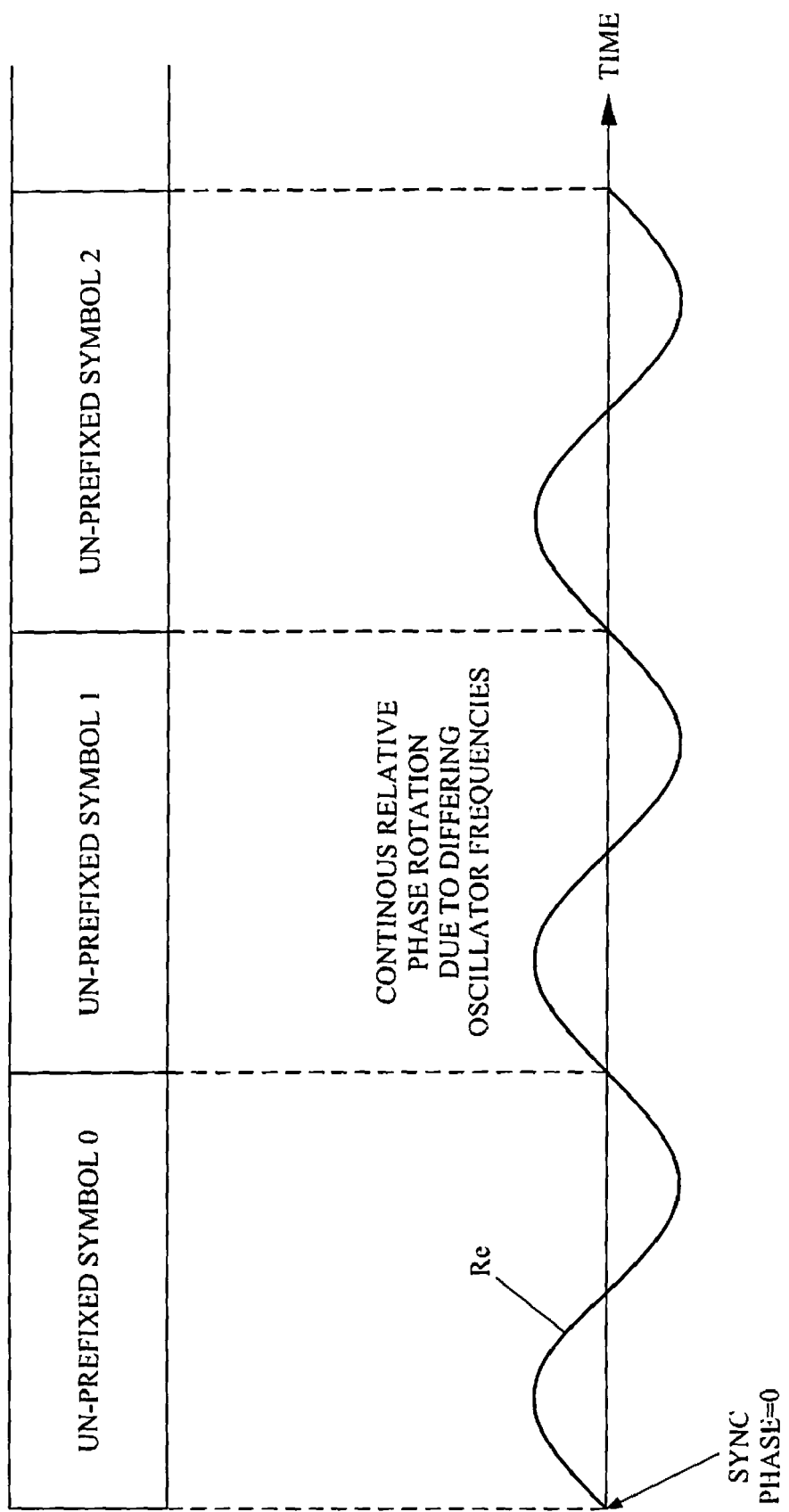
FIG. 8 is a diagram illustrating the characteristics of signals obtained by the arrangement in FIG. 7.

FIG. 8 is a diagram illustrating the characteristics of signals obtained by the arrangement in FIG. 7. The figure shows a sequence of un-prefixed symbols, for example $x_2(n)$ in FIG. 7. These signals are up-converted using the oscillator frequency $f_{2C}$. Assume that the Offset is only 1 frequency bin (1 subcarrier spacing). This is of course not a realistic value (a typical value would be, for example 512), but it is a convenient value for illustrating the principle. This means that the continuous relative phase rotation due to differing oscillator frequencies $f_{1C}$ and $f_{2C}$ will be 1 period per un-prefixed symbol, as illustrated in the lower part of FIG. 8, which shows the real part of the complex phase rotation. It is noted that with the chosen synchronization (phase zero at the beginning of a subframe), every un-prefixed symbol starts at a relative phase rotation of zero. This means that the relative phase rotations caused by the differing oscillator frequencies and the phase rotations caused by the modulation function M(n,Offset) described above are both zero at the beginning of each un-prefixed symbol $x_1(n) \ldots x_4(n)$. This is the reason that the arrangement in FIG. 7 would actually work for un-prefixed OFDM symbols.

Figure 9:
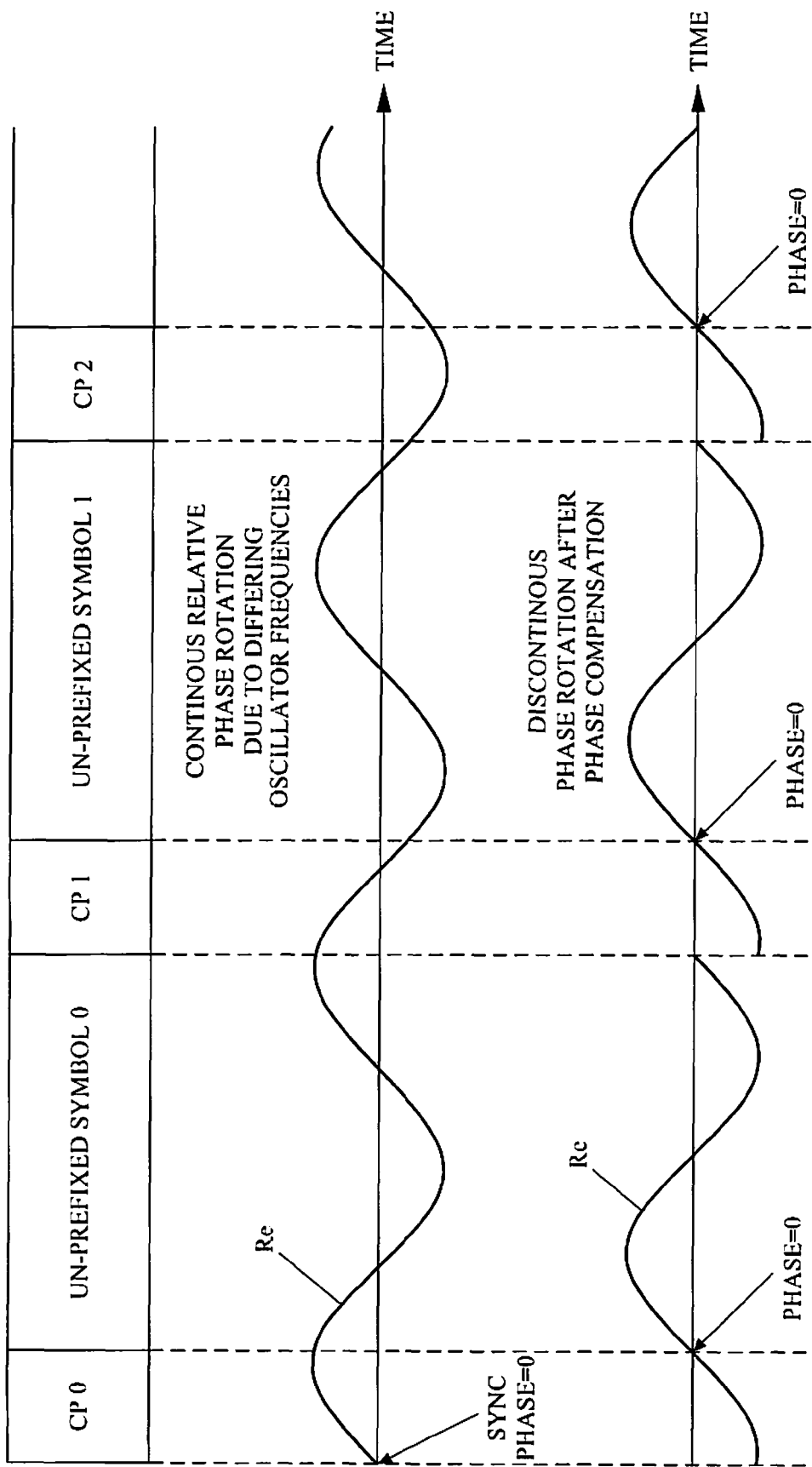
FIG. 9 is a diagram illustration a second step towards the present invention.

However, a typical OFDM system, such as an LTE system, includes cyclic prefixes. This case is illustrated in FIG. 9. Now there are cyclic prefixes between the un-prefixed symbols. Since the oscillators have the same frequencies $f_{1C} \ldots f_{4C}$ as in the arrangement of FIG. 7 and the prefixed symbols are longer than the un-prefixed symbols, the continuous relative phase rotation due to differing oscillator frequencies no longer is zero at the beginning of each un-prefixed symbol. This is illustrated in the middle of FIG. 9. This will destroy the OFDM multi-carrier structure of the combined signal. However, in accordance with the present invention the OFDM multi-carrier structure may be restored by adding phase compensations to the OFDM symbols before up-conversion. This is illustrated by the lower part of FIG. 9, where the added phase compensations have restored phase zero at the beginning of each un-prefixed symbol.

As an example, for an LTE system with an IDFT (IFFT) size N=2048, an Offset of 512 and a normal cyclic prefix, the accumulated phase compensations over a subframe are given in Table 1 below:

TABLE 1

| Symbol | Cyclic Prefix (# of samples) | Accumulated Phase |
|---|---|---|
| 0 | 160 | 160. φ |
| 1 | 144 | 304. φ |
| 2 | 144 | 448. φ |
| 3 | 144 | 592. φ |
| 4 | 144 | 736. φ |
| 5 | 144 | 880. φ |
| 6 | 144 | 1024. φ |
| 7 | 160 | 1184. φ |
| 8 | 144 | 1328. φ |

TABLE 1-continued

| Symbol | Cyclic Prefix (# of samples) | Accumulated Phase |
|---|---|---|
| 9 | 144 | 1472. φ |
| 10 | 144 | 1616. φ |
| 11 | 144 | 1760. φ |
| 12 | 144 | 1904. φ |
| 13 | 144 | 2048. φ | where $$\phi = \frac{2\pi \cdot \text{Offset}}{N} \quad (8)$$

After a subframe the total phase compensation is back to zero.

Figure 10:
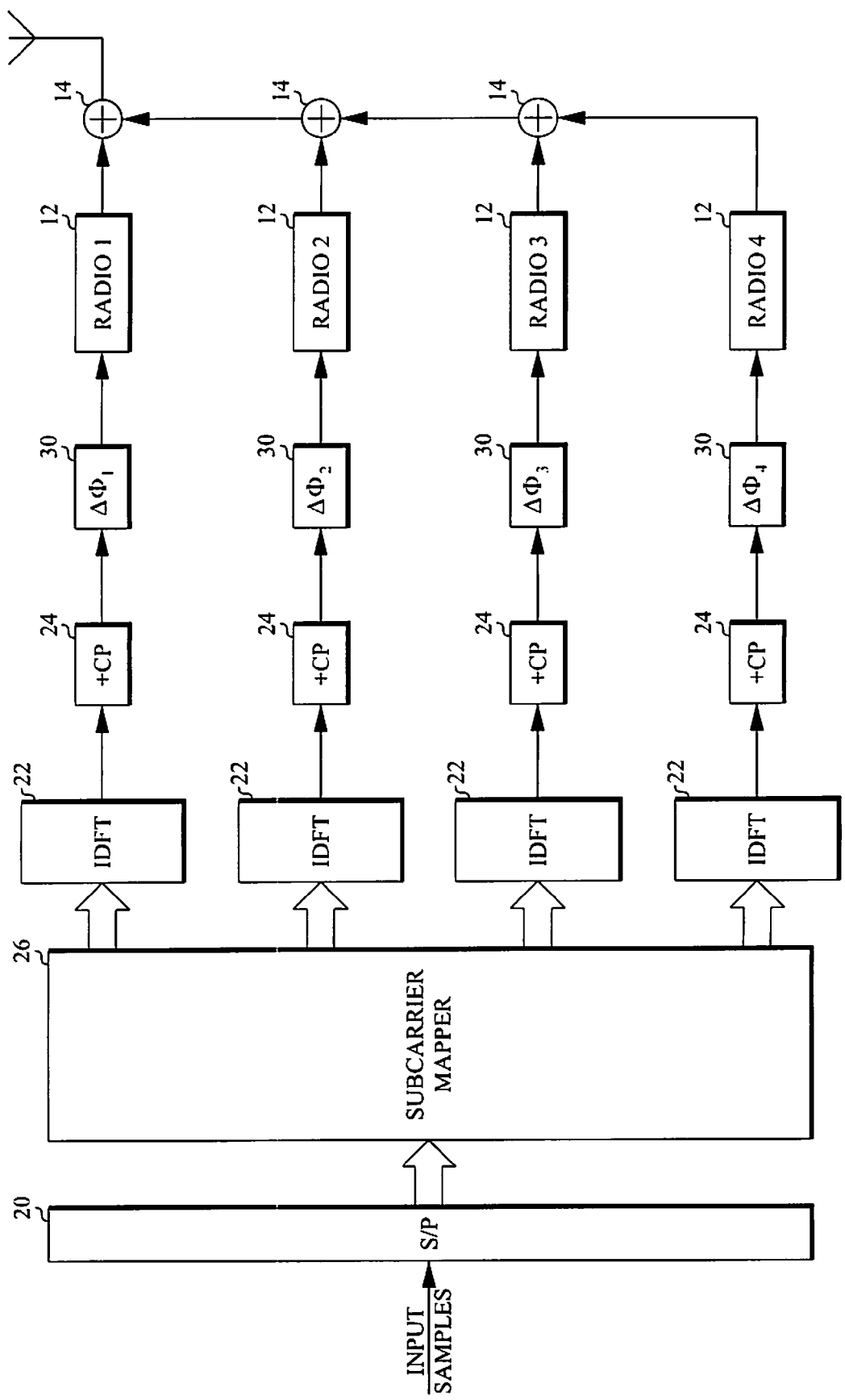
FIG. 10 is a block diagram illustrating the basic principles of an embodiment of a base station arrangement in accordance with the present invention for forming an OFDM signal from a baseband signal.

FIG. 10 is a block diagram illustrating the basic principles of an embodiment of a base station arrangement in accordance with the present invention. It differs from the arrangement in FIG. 7 by the inclusion of cyclic prefix adders 24 and phase compensators 30 between IDFT blocks 22 and radio units 12.

Figure 11:
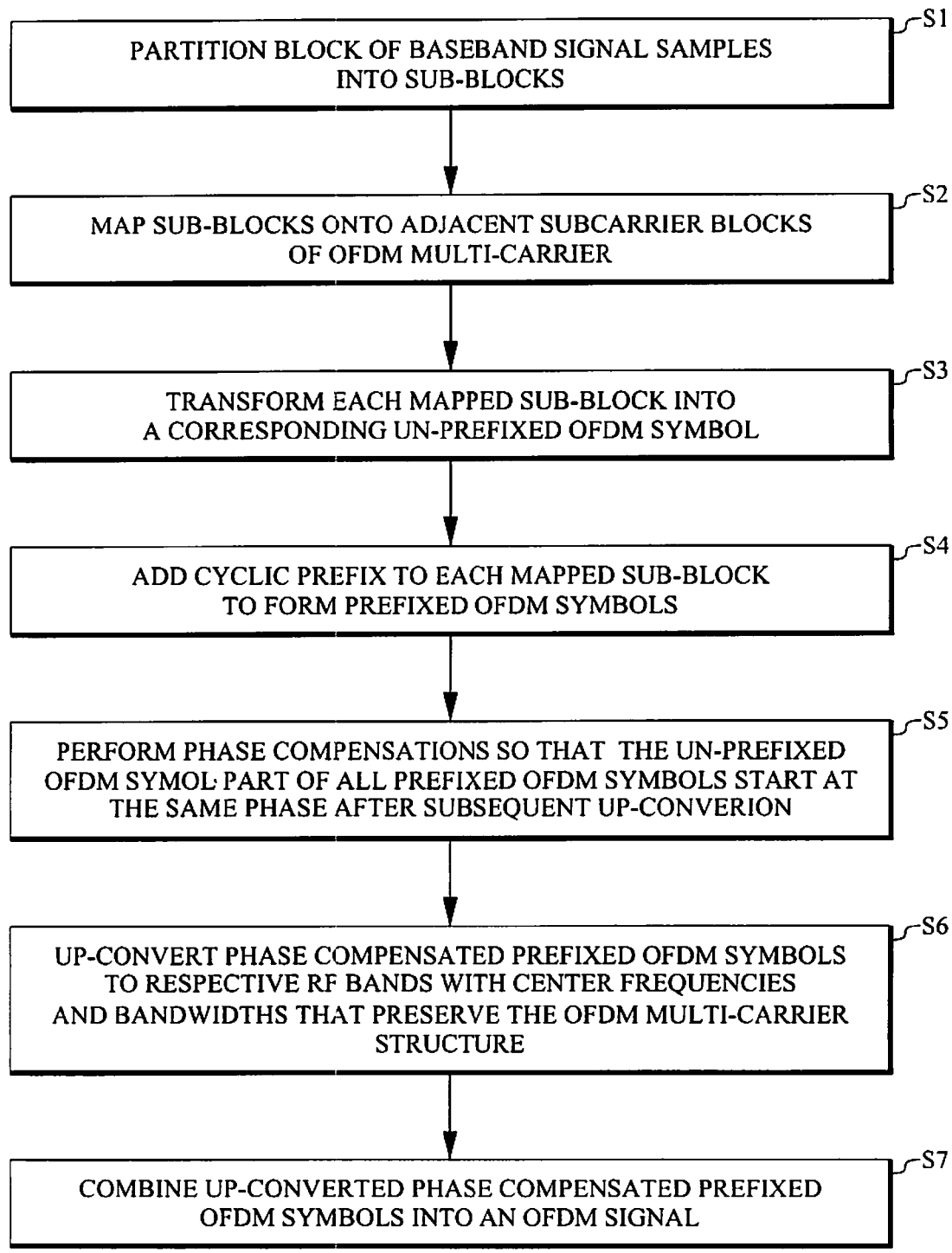
FIG. 11 is a flow chart illustrating the basic principles of an embodiment of a method in accordance with the present invention for forming an OFDM signal from a baseband signal.

FIG. 11 is a flow chart illustrating the basic principles of an embodiment of a method in accordance with the present invention for forming an OFDM signal from a baseband signal. Step S1 partitions a block of the baseband into sub-blocks. Step S2 maps the sub-blocks onto adjacent subcarrier blocks of the OFDM multi-carrier. Step S3 transforms each mapped sub-block into a corresponding un-prefixed OFDM symbol. Step S4 adds a cyclic prefix to each mapped sub-block to form prefixed OFDM symbols. Step S5 performs phase compensations so that the un-prefixed OFDM symbol part of all prefixed OFDM symbols start at the same phase after subsequent up-conversion. This compensates for phase shifts caused by adding cyclic prefixes that will be up-converted to different radio frequency bands. In step S6 the phase compensated prefixed OFDM symbols are up-converted to respective radio frequency (RF) bands with center frequencies and bandwidths that preserve the OFDM multi-carrier structure. In step S7 the up-converted phase compensated prefixed OFDM symbols are combined into an OFDM signal. Although the phase compensating step S5 has been described after step S4, it is appreciated that this step may actually be performed anywhere before the up-converting step S7 (even before the partitioning step S1).

Figure 12:
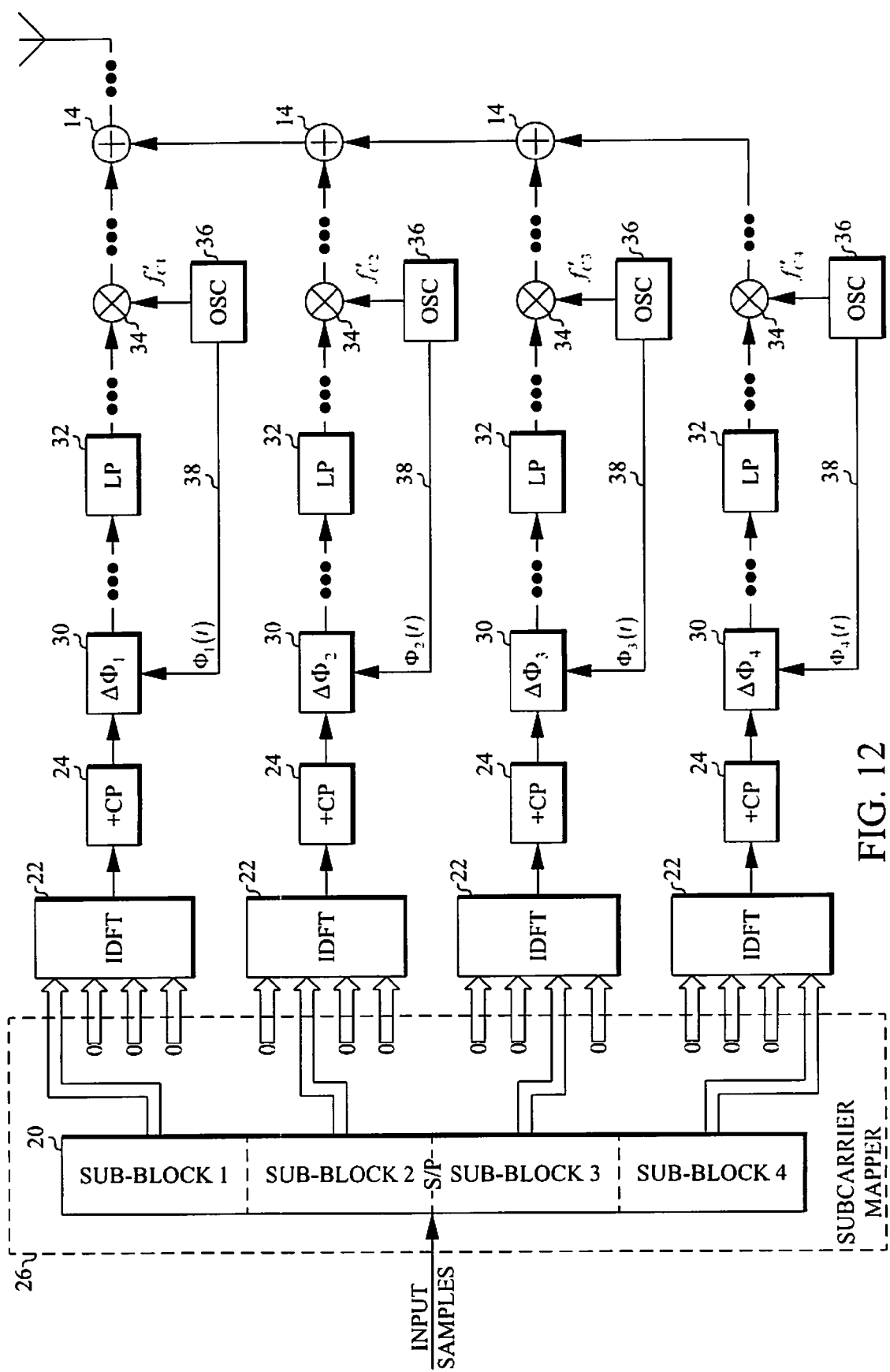
FIG. 12 is a block diagram of another embodiment of a base station arrangement in accordance with the present invention for forming an OFDM signal from a baseband signal.

FIG. 12 is a block diagram of another embodiment of a base station arrangement in accordance with the present invention for forming an OFDM signal from a baseband signal. The dots in the figure (and subsequent figures) represent elements, such as power amplifiers, D/A converters, etc which are typically included in a radio, but are not necessary for explaining the present invention. Each radio includes a mixer 34, 36 for up-converting the prefixed OFDM symbols. The mixers includes oscillators 36 operating at frequencies $f_{1C}K f_{4C}$. Preferably there are feedback lines 38 from oscillators 36 to phase compensators 30 to keep track of the oscillator phases $\Phi_1(t) K \Phi_4(t)$, as will be described in more detail below. Preferably there also are lowpass filters 32 that filter the prefixed OFDM symbols before up-conversion.

Figure 13:
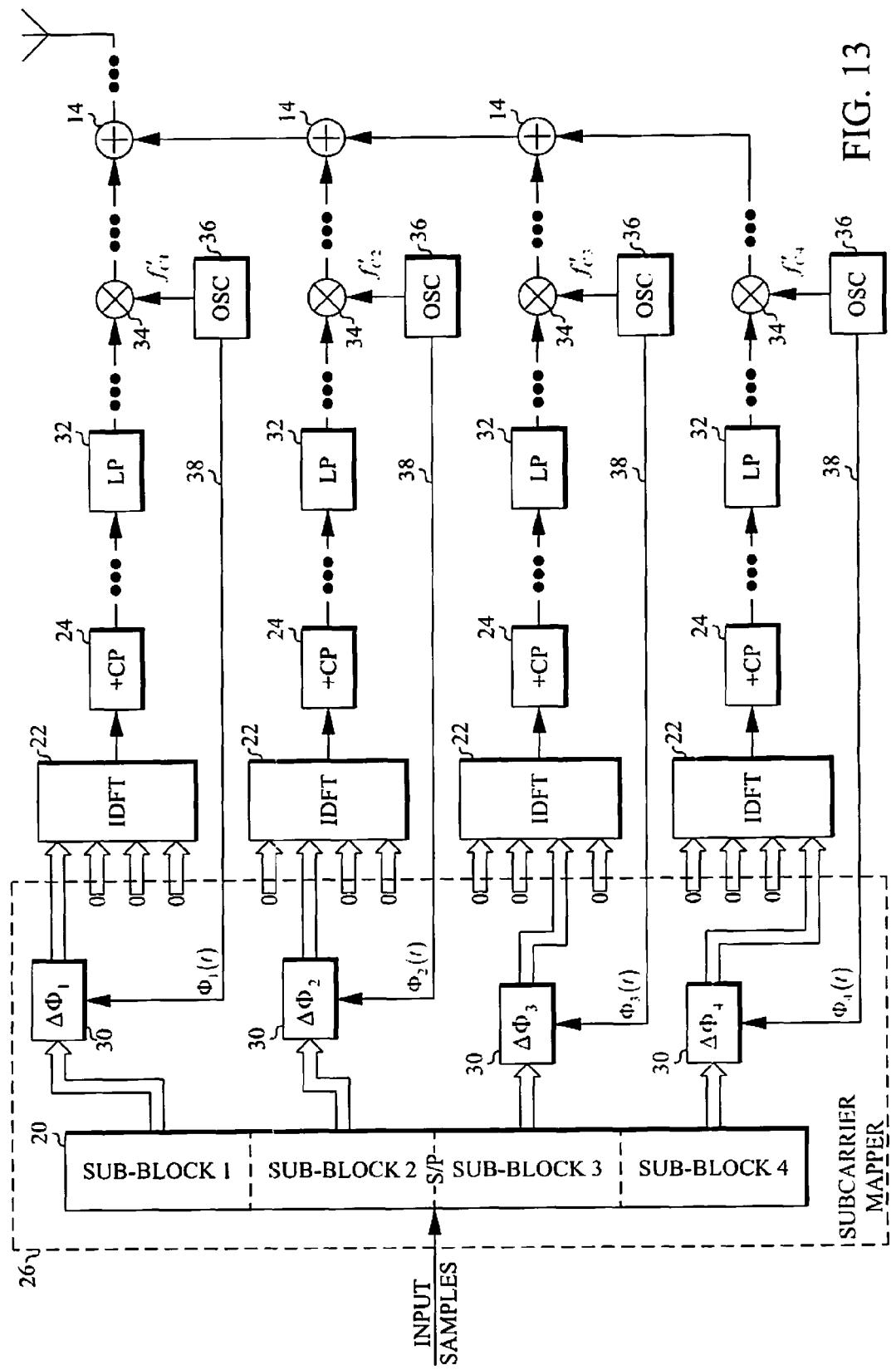
FIG. 13 is a block diagram of another embodiment of a base station arrangement in accordance with the present invention for forming an OFDM signal from a baseband signal.

FIG. 13 is a block diagram of another embodiment of a base station arrangement in accordance with the present invention for forming an OFDM signal from a baseband signal. This embodiment differs from the embodiment in FIG. 12 in that the phase compensators 30 are located in front of rather than after the IDFT blocks 22. In fact, the location of these phase compensators is very flexible. Due to the fact that the cyclic prefix addition and the IDFT are linear operations, as seen by the un-prefixed part of the OFDM symbol, the phase compensations can be located anywhere in the partitioned data streams up to the actual up-conversion to RF (or lowpass filtering, if applicable). In fact, phase compensation may even be performed before actual partitioning into separate data streams by applying different phase compensations to different segments (sub-blocks) of the un-partitioned input sample stream.

The mixers 34, 36 may be implemented either in the digital or analog domain. In the digital domain the oscillators 36 are typically implemented as numerically controlled oscillators (NCOs).

The description has so far focused on forming an OFDM signal from a baseband signal. However, similar principles may also be applied to the reverse process, namely to form a baseband signal from an OFDM signal.

Figure 14:
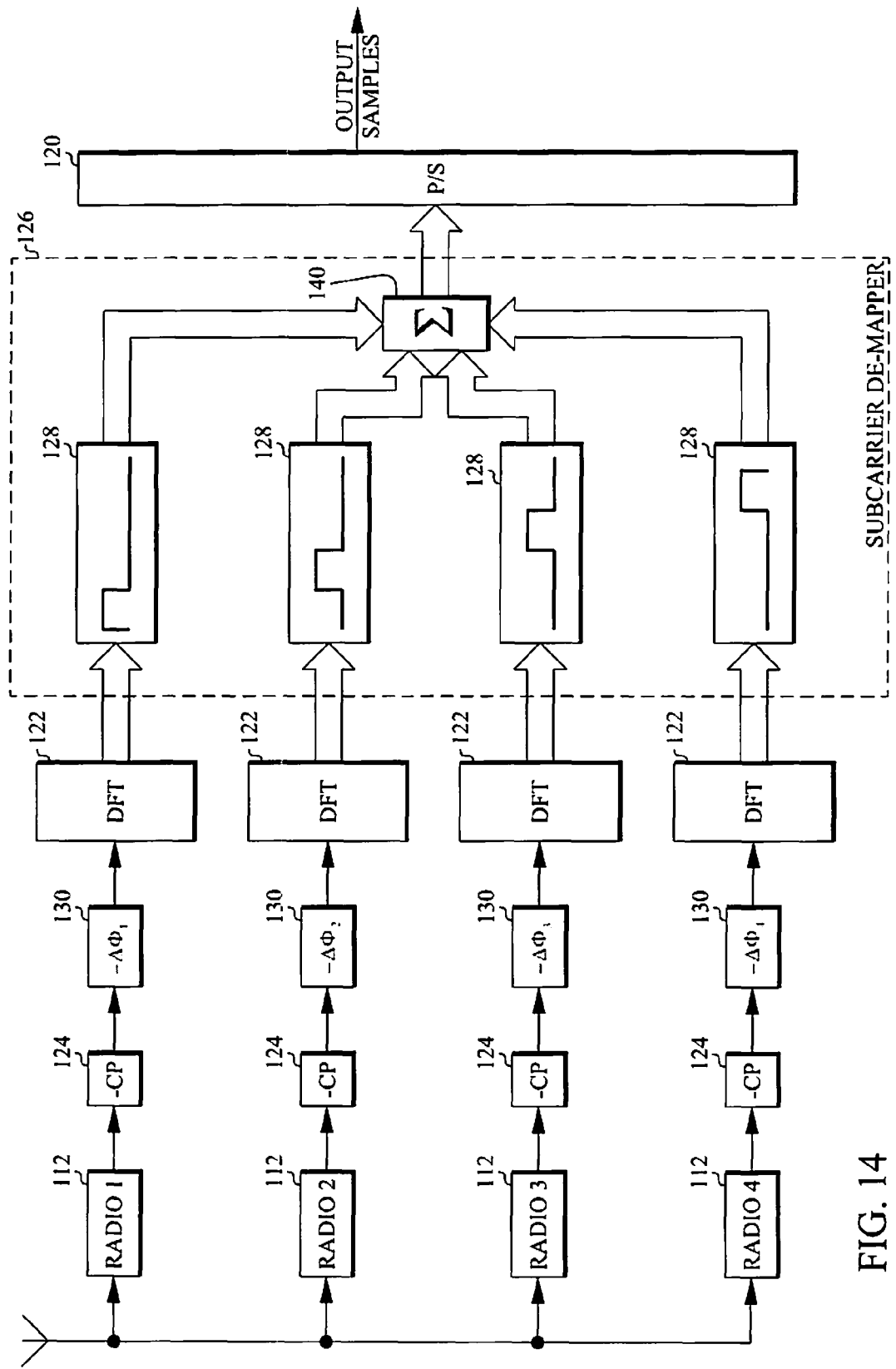
FIG. 14 is a block diagram illustrating the basic principles of an embodiment of a base station arrangement in accordance with the present invention for forming a baseband signal from an OFDM signal.

FIG. 14 is a block diagram illustrating the basic principles of an embodiment of a base station arrangement in accordance with the present invention for forming a baseband signal from an OFDM signal. In this case the described steps are essentially performed in reverse order with the sign of the phase compensation reversed (the IDFT is also replaced by a DFT, typically implemented by an FFT).

Figure 15:
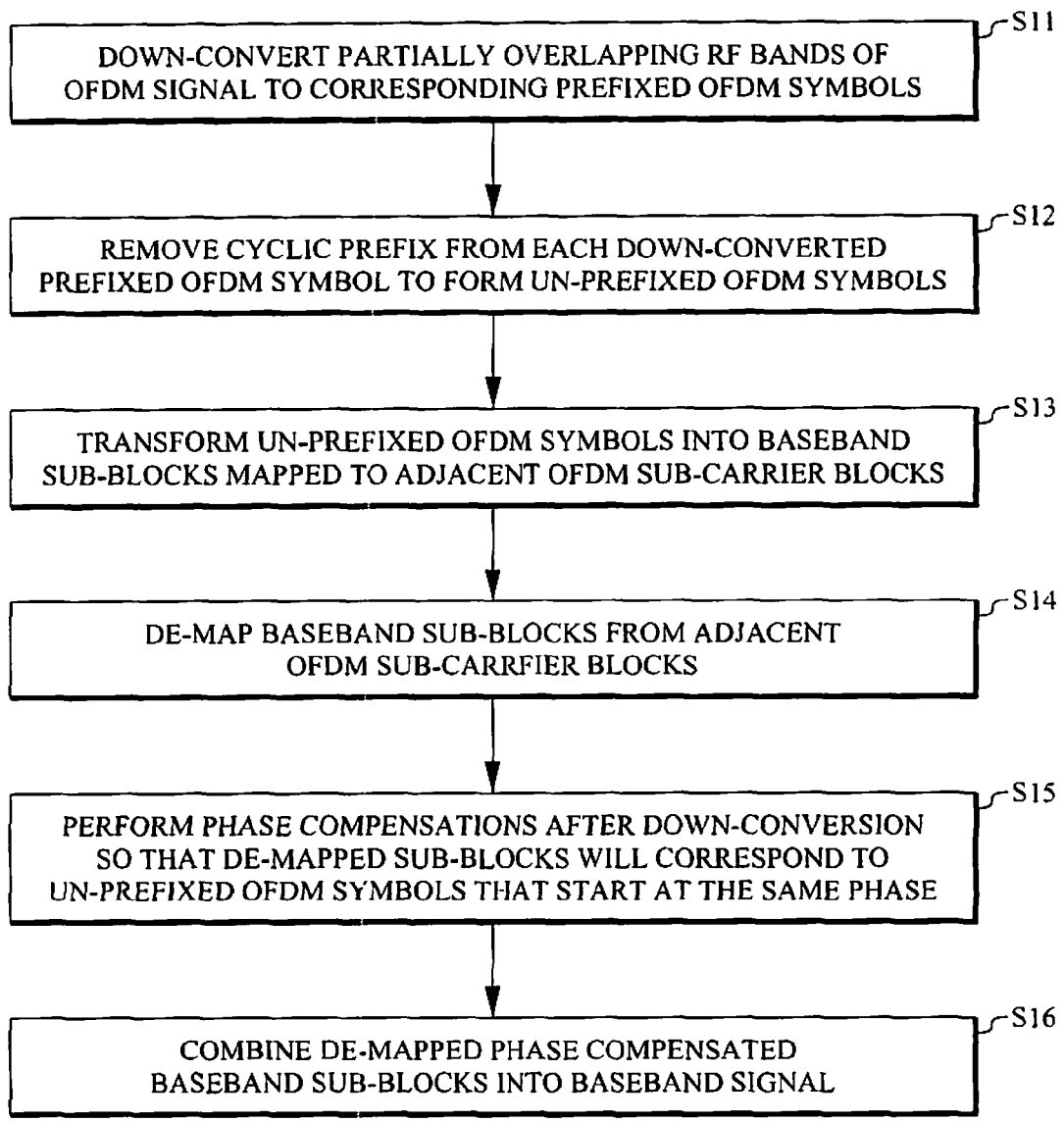
FIG. 15 is a flow chart illustrating the basic principles of an embodiment of a method in accordance with the present invention for forming a baseband signal from an OFDM signal.

FIG. 15 is a flow chart illustrating the basic principles of an embodiment of a method in accordance with the present invention for forming a baseband signal from an OFDM signal. Step S11 down-converts partially overlapping radio frequency (RF) bands of an OFDM signal to corresponding prefixed OFDM symbols. Step S12 removes the cyclic prefix from each down-converted prefixed OFDM symbol to form un-prefixed OFDM symbols. Step S13 transforms the un-prefixed OFDM symbols into baseband sub-blocks mapped to adjacent OFDM subcarrier blocks. Step S14 de-maps the baseband sub-blocks from the adjacent OFDM subcarrier blocks. Step S15 performs phase compensations after down-conversion so that the de-mapped baseband sub-blocks will correspond to un-prefixed OFDM symbols that start at the same phase. This compensates for phase shifts caused by removal of cyclic prefixes that have been down-converted from different radio frequency bands. Step S16 combines the phase compensated de-mapped baseband sub-blocks into a baseband signal. Although the phase compensating step S15 has been described after step S14, it is appreciated that this step may actually be performed anywhere after the down converting step S11 (even after the combining step S16).

Figure 16:
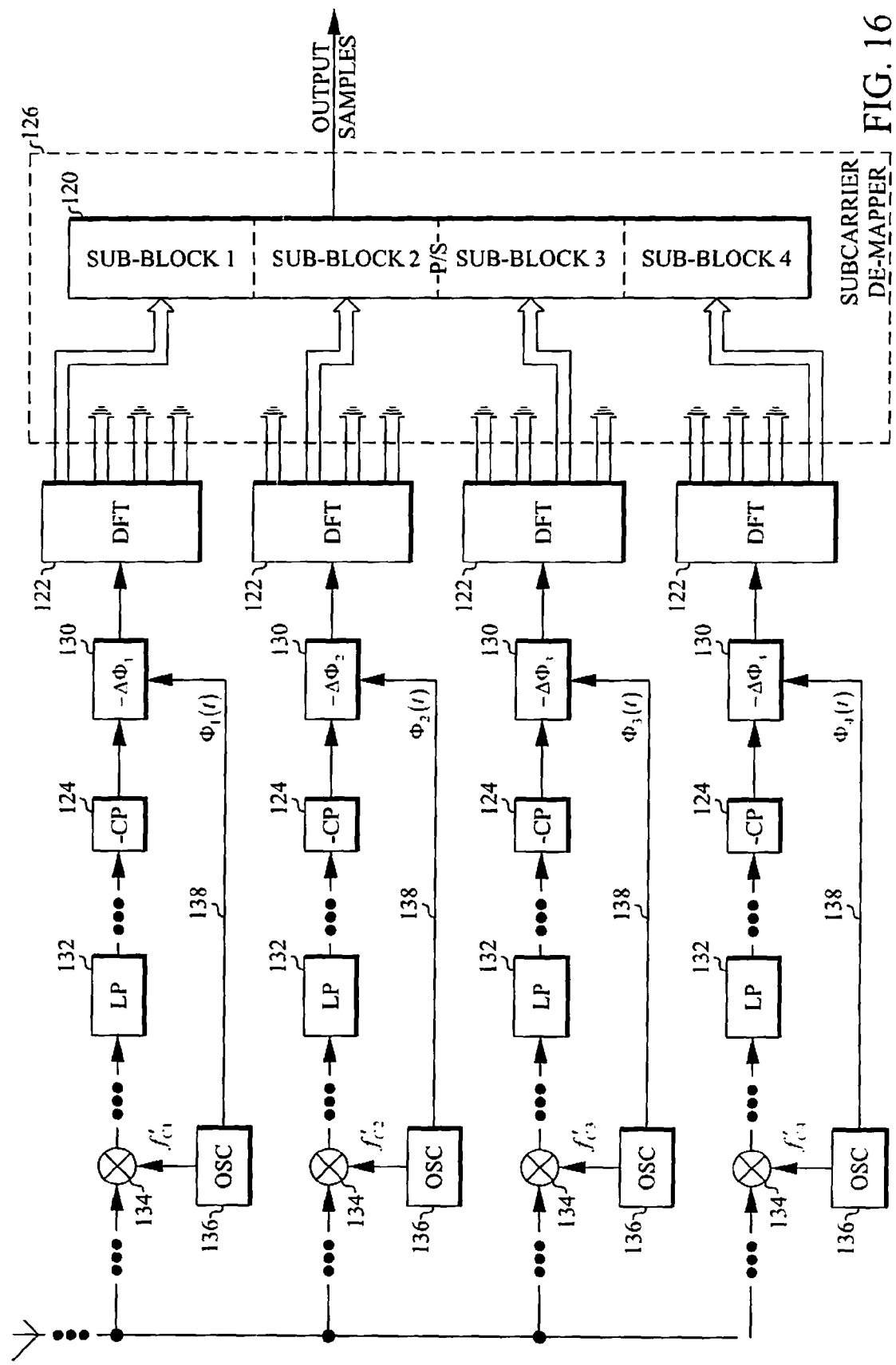
FIG. 16 is a block diagram of another embodiment of a base station arrangement in accordance with the present invention for forming a baseband signal from an OFDM signal.

FIG. 16 is a block diagram of another embodiment of a base station arrangement in accordance with the present invention for forming a baseband signal from an OFDM signal. Each radio includes a mixer 134, 136 for down-converting the prefixed OFDM symbols. The mixers includes oscillators 136 operating at frequencies $f'_{1C}K f'_{4C}$. Preferably there are feedback lines 138 from oscillators 136 to phase compensators 130 to keep track of the oscillator phases $\Phi_1(t) K \Phi_4(t)$ (it is noted that the signs of the phase compensations are reversed as compared to the downlink). Preferably there also are lowpass filters 132 that filter the prefixed OFDM symbols after down-conversion. Cyclic prefix removers 124 remove the prefix from each prefixed OFDM symbol. The un-prefixed OFDM symbols are forwarded to DFT blocks 122. The output signals from DFT blocks 122 are forwarded to a subcarrier de-mapper 126 and combined into an output sample stream.

Figure 17:
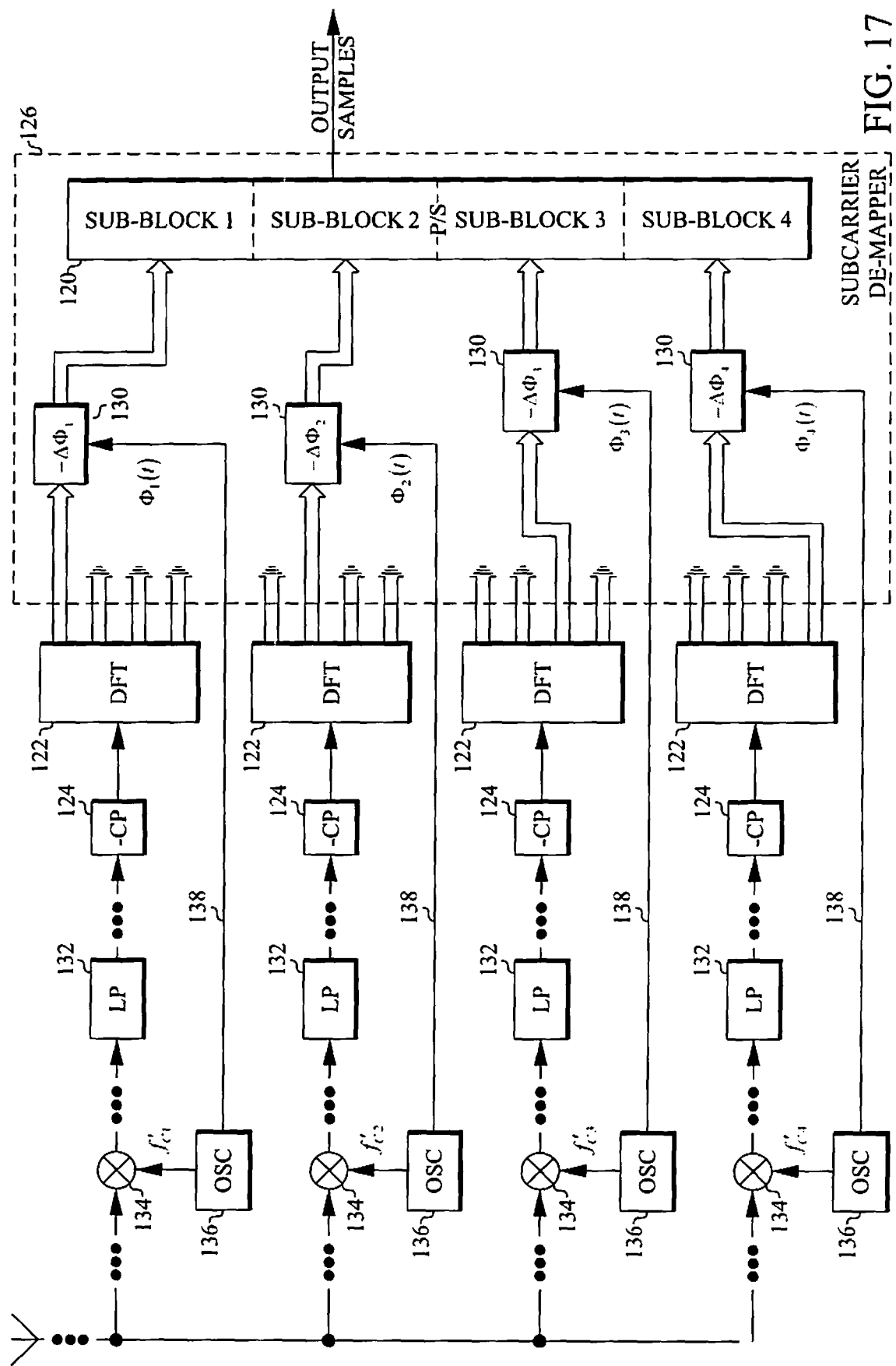
FIG. 17 is a block diagram of another embodiment of a base station arrangement in accordance with the present invention for forming a baseband signal from an OFDM signal.

FIG. 17 is a block diagram of another embodiment of a base station arrangement in accordance with the present invention for forming a baseband signal from an OFDM signal. This embodiment differs from the embodiment in FIG. 16 in that the phase compensators 130 are located after rather than in front of the DFT blocks 122. In fact, the location of these phase compensators is very flexible. Due to the fact that the cyclic prefix removal and the DFT are linear operations, as seen by the un-prefixed part of the OFDM symbol, the phase compensations can be located anywhere in the data streams after the actual down-conversion from RF (or lowpass filtering, if applicable). In fact, phase compensation may even be performed after actual combination into a single data streams by applying different phase compensations to different segments (sub-blocks) of the output sample stream.

The mixers 134, 136 may be implemented either in the digital or analog domain. In the digital domain the oscillators 136 are typically implemented as numerically controlled oscillators (NCOs).

Figure 18:
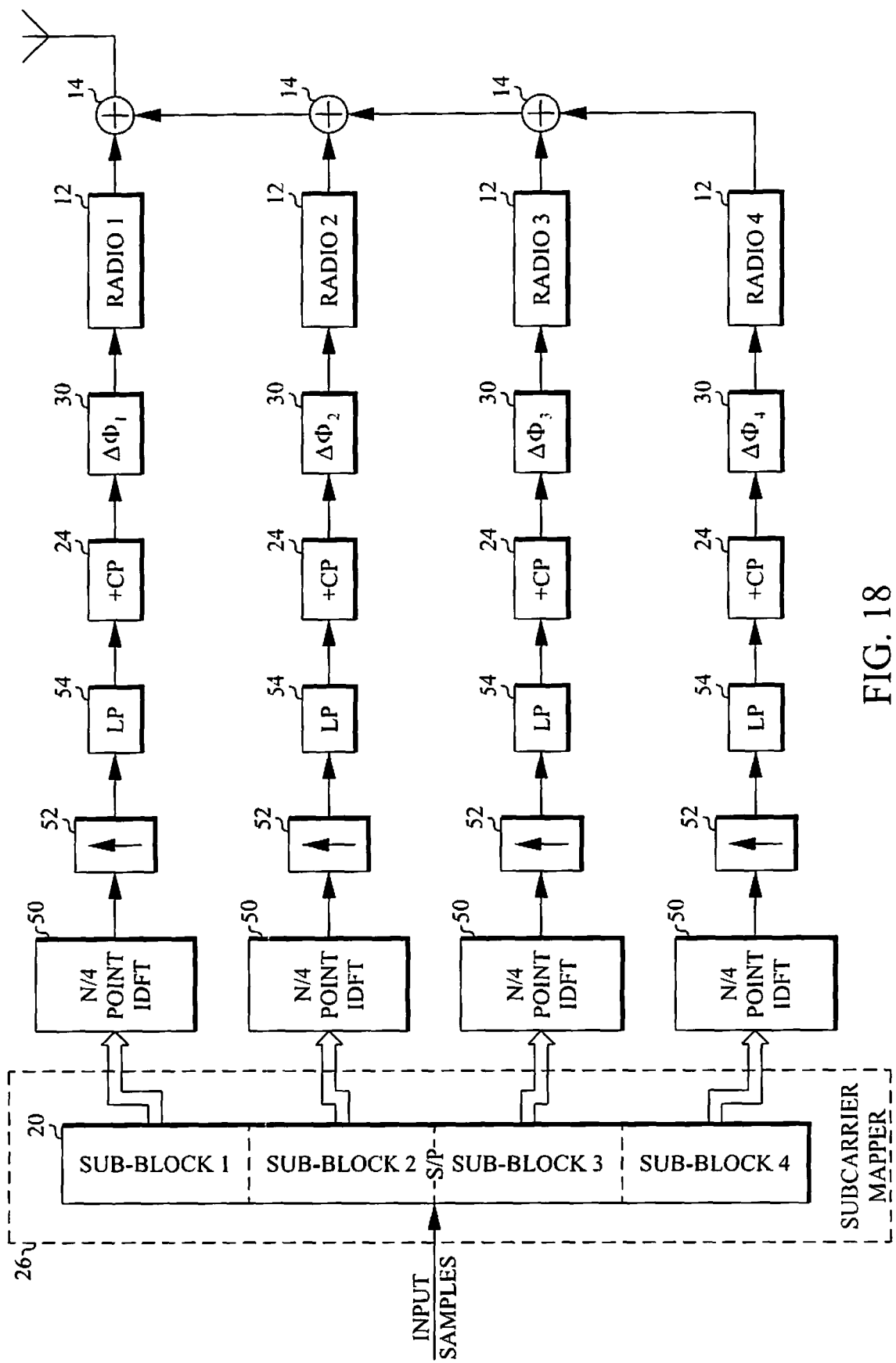
FIG. 18 is a block diagram illustrating the basic principles of another embodiment of a base station arrangement in accordance with the present invention for forming an OFDM signal from a baseband signal.
Figure 19:
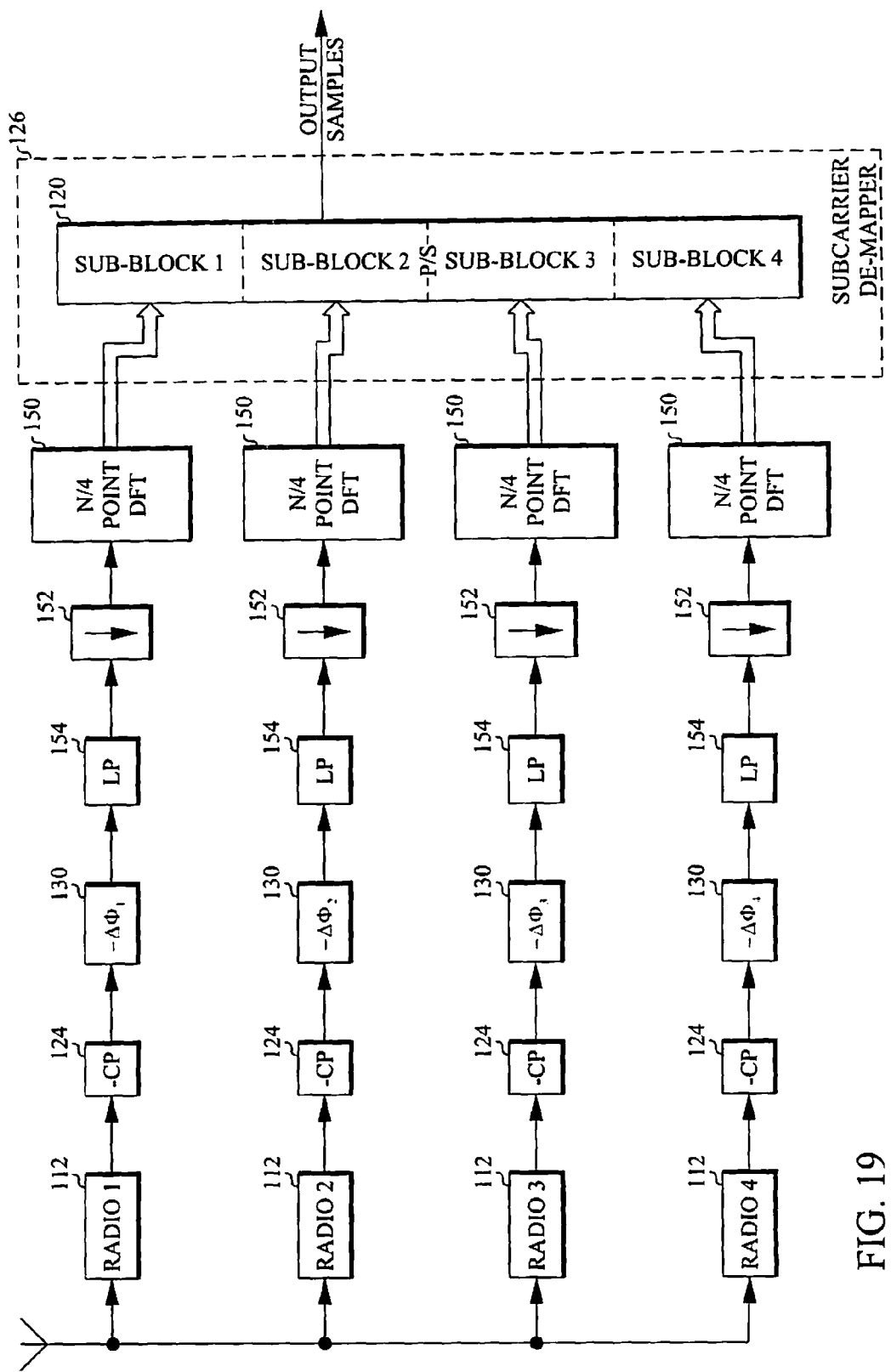
FIG. 19 is a block diagram illustrating the basic principles of another embodiment of a base station arrangement in accordance with the present invention for forming a baseband signal from an OFDM signal.

The embodiments described so far are based on full N-point IDFTs and DFTs following the mathematical description above, in which the interpolation is accomplished by zero-padding and the decimation is accomplished by discarding blocks of DFT output samples. However, an alternative is to use shorter, for example N/4-point IDFTs and DFTs. In the downlink upsampling or interpolation is performed by zero-filling between IDFT output samples and lowpass filtering, as illustrated in FIG. 18. In the uplink downsampling or decimation is performed by lowpass filtering and compression (skipping samples) before the DFT, as illustrated in FIG. 19. All the different phase compensation positions and feedback paths in the previously described embodiments are valid choices also for embodiments based on N/4-point IDFTs and DFTs.

FIG. 18 is a block diagram illustrating the basic principles of another embodiment of a base station arrangement in accordance with the present invention for forming an OFDM signal from a baseband signal. The signals from subcarrier mapper 26 are forwarded to N/4-point IDFTs 50 and then interpolated in interpolators formed by up-samplers 52 and lowpass filters 54. After interpolation the signals are processed as in the previously described embodiments.

FIG. 19 is a block diagram illustrating the basic principles of another embodiment of a base station arrangement in accordance with the present invention for forming a baseband signal from an OFDM signal. The un-prefixed OFDM symbols are decimated in decimators formed by down-samplers 154 and down-samplers 152. The decimated signals are forwarded to N/4-point DFTs 150, and then de-mapped and combined.

In the description above the frequency bands all had the same bandwidth. However, this is not a necessary feature. For example, the outer frequency bands may be narrower than the middle frequency bands. This will reduce the number of filter taps needed to implement a rapid filter slope at the band edges of the spectrum of the combined signal.

A convenient way to implement the described aspects of the present invention is to use the Common Public Radio Interface (CPRI). The CPRI interface is an industry cooperation defining a publicly available specification for the key internal interface of radio base stations between the Radio Equipment Control (REC) and the Radio Equipment (RE). The CPRI specification enables flexible and efficient product differentiation for radio base stations and independent technology evolution for the RE and the REC. When connecting a REC and a RE with a CPRI interface, the resulting entity is a Node B in a WCDMA Radio Access Network terminology. Further information about CPRI, and the latest specification, may be found the CPRI Specification V3.0 (2006 Oct. 20).

A typical CPRI implementation of the downlink branch of a base station arrangement in accordance with the present invention includes:
REC:
  A number of narrow-band IFFTs.
  A baseband controller aware of the air frame structure of the LTE standard.
  A CPRI interface.
RE:
  A CPRI interface.
  A wide-band channel implemented by one or more wide-band transmitters.
  A multitude of narrow-band channels, each associated with
    Preferably a low pass filter for spectrum shaping
    A mixer to move the narrow-band channel to the correct position in the wide-band channel.
    A Numerically Controlled Oscillator (NCO) to generate the correct frequency of the narrow-band channel.
Furthermore, a phase correction function, for instance implemented as a complex multiplier per narrow band channel (RE or REC placement) will be required.

Preferably an NCO controller capable of controlling or reading the NCO value at a distinct time is included.

The phase of the narrow band signal at any instant depends on the phase of the corresponding NCO at that time. It is not recommended to make an instantaneous setting of the NCO phase at each un-prefixes OFDM symbol start as this would give a phase jump, which in turn gives a spectrum widening which may no longer fulfil the legal RF requirements. Instead, the phase of the NCO at the un-prefixed OFDM symbol start is preferably predicted and compensated for before the low pass filter. One phase correction value is applied per un-prefixed OFDM symbol. The compensation is either applied in the frequency plane (before the IFFT) or in the time domain (after the IFFT).

Figure 20:
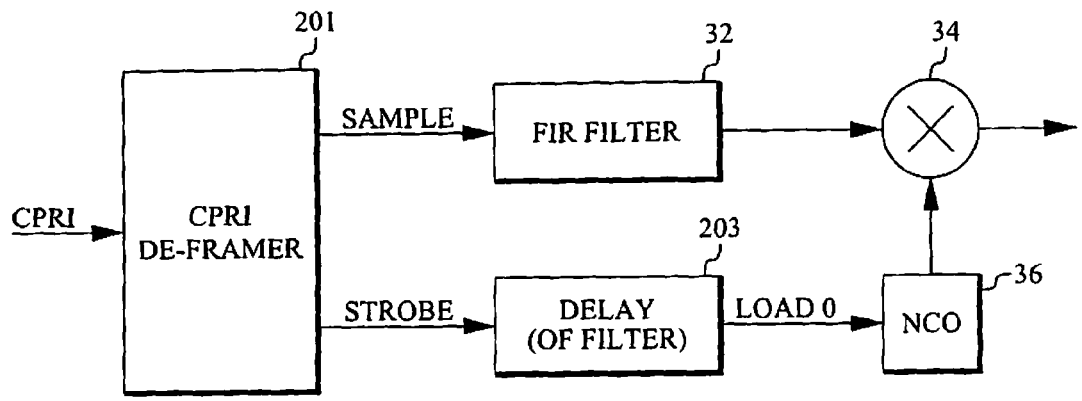
FIG. 20 is a block diagram illustrating an embodiment of an arrangement for controlling a numerically controlled oscillator in an embodiment of the present invention based on the CPRI interface.
Figure 21:
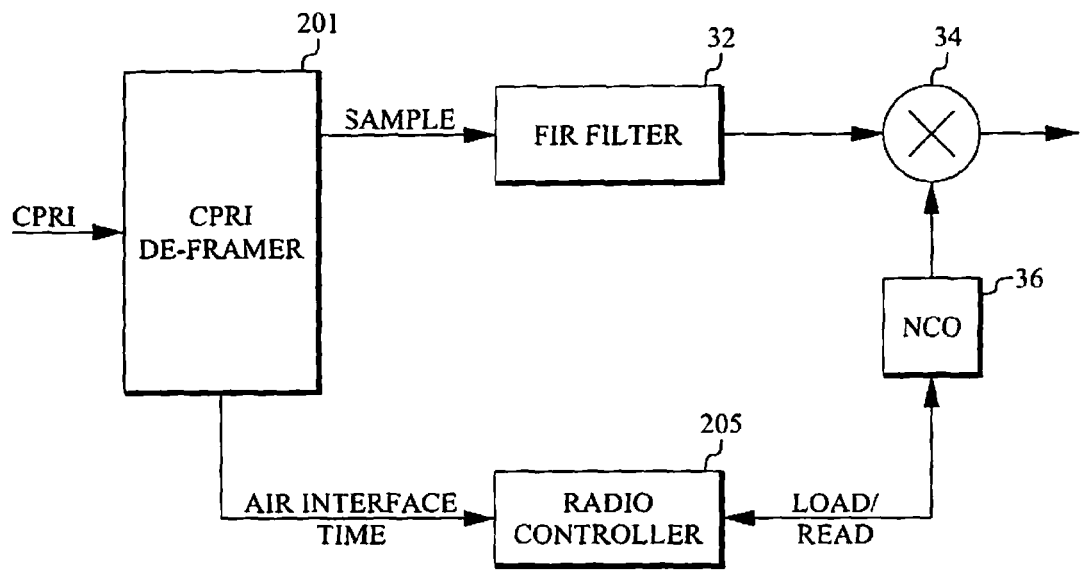
FIG. 21 is a block diagram illustrating an embodiment of an arrangement for controlling and reading a numerically controlled oscillator in an embodiment of the present invention based on the CPRI interface.

The phase of the NCO at the first sample of the un-prefixed OFDM symbol from the IFFT is determined at the place it is compensated for. If it is compensated for in the REC, the phase of the NCO in the RE is communicated to the REC. This can be done in different ways:
  By the REC specifying a certain sample where the NCO is loaded with a specific value, e.g. 0, as illustrated in FIG. 20. For instance, the REC states that the NCO shall be loaded with 0 when the multiplier consumes a sample from a specific basic frame in CPRI.
  By the REC specifying a certain sample where the NCO shall be read. As above, but instead of loading the NCO, the value of the NCO is read and communicated to the REC. For instance, the NCO value could be read for the sample of CPRI basic frame 0, HFN=0, i.e. every 10 ms.
  By the REC specifying a certain air interface time where the NCO phase shall be read or reset, as illustrated in FIG. 21. For instance, the RE loads the NCO with value 0 at reception of CPRI frame strobe (reception of basic frame 0, HFN=0).
  A combination of the above—the REC informs the RE to send the sample in a certain basic frame at a certain time after reception of a CPRI frame strobe, and reading the phase offset of the NCO when the sample reaches the multiplier.

In case the phase compensation is done in the RE, a similar method as described above is used to control or monitor the NCO, with the difference that the information is not needed to be sent to the REC. On the other hand, the baseband controller needs to send information to the RE about which samples are the first samples of unprefixed OFDM symbols. The information transfer can be done in different ways:

By the REC specifying which CPRI basic frame contains the first sample of the un-prefixed OFDM symbol. For instance, the REC can send one message every 1 ms containing a list of HFN number and basic frame numbers for the start of each un-prefixed OFDM symbol part of that LTE sub frame.

By the REC specifying where the symbols are located in relation to the air interface time. For instance, the REC can send one message every 1 ms containing a list of time instants where un-prefixed OFDM symbols start in relationship to the CPRI frame strobe.

A combination of the above—where the REC specifies in which CPRI basic frame the first sample of an un-prefixed OFDM symbols is located, and at what time it will reach the air compared to the CPRI frame strobe.

A typical CPRI implementation of the uplink branch of a base station arrangement in accordance with the present invention includes:

REC:
A number of narrow-band FFTs.
A baseband controller aware of the air frame structure of the LTE standard.
A CPRI interface.

RE:
A CPRI interface
A wide-band channel implemented by one or more wide-band receivers.
A multitude of narrow-band channels, each associated with
  A Numerically Controlled Oscillator (NCO) to generate the correct frequency of the narrow-band channel.
  A mixer to move the narrow-band channel to baseband.
  Preferably a low pass filter for spectrum shaping.

The REC and the RE may be enhanced with the following functions to implement the present invention:
A phase correction function, for instance implemented as a complex multiplier per narrow band channel (RE or REC placement) is required.
Preferably an NCO controller capable of controlling or reading the NCO value at a distinct time, is included.

The principles used for the uplink are similar to those used for the downlink. Correspondingly, we need to know the phase of the NCO at the time of the first sample of each FFT.

For a pure OFDM system, the phase correction can be done either in the RE or the REC, as for downlink. For an LTE system, some signals are CDMA coded and cannot be subject to a stepwise phase rotation. Therefore, in LTE, the phase correction should be applied in the REC, so the REC has access to both the original signal and the phase continuous signal.

In one embodiment of the invention, the narrow band carriers are chosen wide enough to cover at least the PUCCH and the RACH. No combination of narrow band carriers is then needed to decode those channels.

The phase offset of the NCO needs to be communicated to the REC. This can be done in different ways:
A certain sample is marked, e.g. as an extra bit following alongside the same, and the offset for the marked sample is sent to the REC in a separate message over the CPRI interface. For instance, every time the NCO reaches 0 phase, the sample is marked.
The NCO phase value for the sample put in a certain CPRI frame is sent to the REC. For instance, the phase value for the sample put in the CPRI basic frame 0, HFN=0 is sent to the REC. As another example, the RE sends a message with two values—the CPRI basic frame number and the phase of the sample in that frame.
The REC indicates when to set the NCO to a certain value. For instance, the REC indicates that the NCO shall be loaded with 0 at a certain time after receiving the CPRI frame strobe. The RE informs the REC the mapping between received DL time (reception of the CPRI frame strobe) and the placement of sample in the uplink CPRI frame structure.

The description of the uplink has so far focused on pure OFDMA systems. However, the same principles are also applicable to SC-FDMA, for example as used in the LTE uplink. The principles of SC-FDMA are briefly illustrated by FIGS. 22 and 23.

Figure 22:
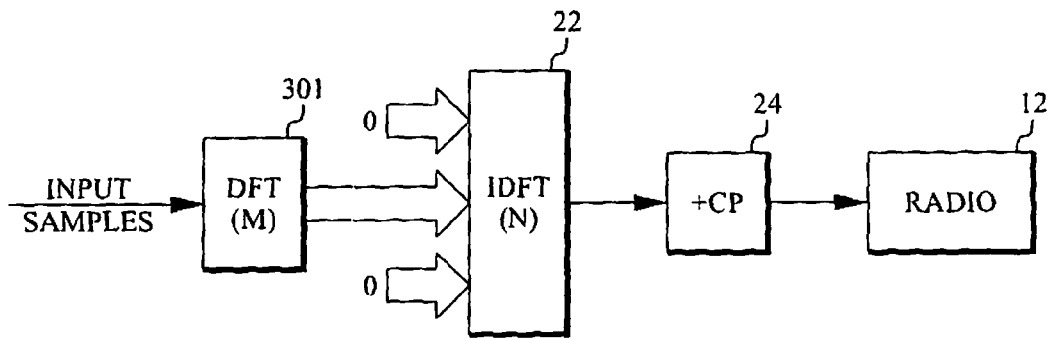
FIG. 22 is a block diagram illustrating the principles of an SC-FDMA up-link transmitter.

FIG. 22 is a block diagram illustrating the principles of an SC-FDMA uplink transmitter. The input samples are forwarded to an M-point DFT block 301. The DFT of the input samples is mapped to predetermined inputs of an N-point IDFT block 22, where N>M, and the remaining inputs are filled with zeroes. The output of N-point IDFT block 22 is forwarded to a cyclic prefix adder 24. The resulting signal is forwarded to a radio 12 for transmission.

Figure 23:
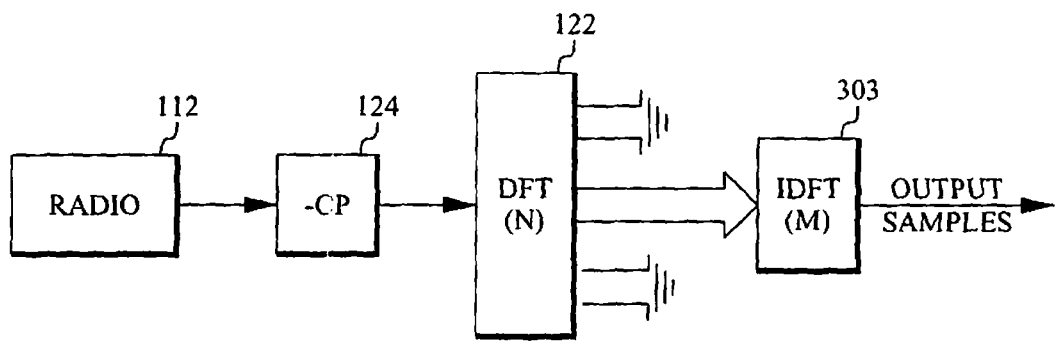
FIG. 23 is a block diagram illustrating the principles of an SC-FDMA up-link receiver.

FIG. 23 is a block diagram illustrating the principles of an SC-FDMA uplink receiver. It is essentially the reverse of the transmitter. A signal received by a radio 112 is forwarded to a cyclic prefix remover 124, and the resulting signal is forwarded to an N-point DFT block 122. Part of the DFT is forwarded to an M-point IDFT block 303 that produces the output samples corresponding to the input samples in FIG. 22.

From FIGS. 22 and 23 it is seen that SC-FDMA is essentially OFDM with pre-processing at the transmitter side and post-processing at the receiver side. For this reason it is also called pre-coded OFDM. This is the term that will be used in this description. Thus, it is appreciated that in pre-coded OFDM the same principles as for pure OFDM may be used on the uplink before the post-processing that involves the M-point IDFT.

An advantage of the present invention is that it enables selective or simultaneous use of WCDMA or LTE through the same radio equipment, using different parts of the spectrum. For example, one or two narrow-band channels may be used for WCDMA and the remaining channels may be used for LTE.

Although the present invention has been described with reference to reuse of WCDMA equipment, this is not strictly necessary. Another application where the present invention would be useful is in implementation of a very wideband OFDM system, such as a 100 MHz bandwidth LTE system. In accordance with the principles outlined above, such a system could be implemented as a combination of 5 20 MHz LTE systems. An advantage of such an implementation is relaxed requirements on the radio equipment of the 20 MHz systems as compared to a pure 100 MHz system. In such an embodiment, the RE would implement multiple transmitters or receivers, each implementing a 20 MHz narrow-band channel, forming a 100 MHz wide-band channel. The analog oscillators OSC in different RE:s have to be controlled to a known phase value. After the digital OSC and analog OSC phase synchronization a new "phase compensation" value for each 20 MHz subband can be calculated.

Examples of implementation details for different blocks described above are:
The narrow-band channel functions may be implemented in an ASIC and/or an FPGA.
The wide-band channel may be implemented in an ASIC and/or in discrete and integrated analog components.
The CPRI interface may be implemented in FPGA.

Control communication between the REC and RE may be handled by FPGA and/or CPU.

The DFT/IDFT and subcarrier mapping may be implemented in an ASIC and/or in DSP software.

The Cyclic Prefix remover on the downlink may be implemented in an FPGA.

The Cyclic Prefix remover on the uplink may be implemented in an ASIC and/or in DSP software.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the appended claims.

ABBREVIATIONS

ASIC Application-Specific Integrated circuit
CPRI Common Public Radio Interface
DFT Discrete Fourier Transform
FFT Fast Fourier Transform
FPGA Field-Programmable Gate Array
HFN HyperFrame Number
IDFT Inverse Discrete Fourier Transform
IFFT Inverse FFT
LTE Long Term Evolution
NCO Numerically Controlled Oscillator (a digital implementation of an oscillator based on a counter and a table look-up)
OFDM Orthogonal Frequency-Division Multiplexing
OFDMA Orthogonal Frequency-Division Multiple Access
RE Radio Equipment (Radio unit in CPRI terminology)
REC Radio Equipment Controller (Base band and control parts in CPRI terminology)
PUCCH Physical Uplink Control Channel, a non-OFDM based channel of ~1 MHz placed in the outer parts of the LTE spectrum.
RACH Random Access Channel, a non-OFDM based channel of ~1 MHz placed in the outer parts of the LTE spectrum.
WCDMA Wideband Code Division Multiple Access.

What is claimed is:

1. A method of forming an OFDM signal from a baseband signal, including the steps of:
   partitioning a block of baseband signal samples into sub-blocks;
   mapping the sub-blocks onto adjacent sub-carrier blocks of an OFDM multi-carrier;
   transforming each mapped sub-block into a corresponding unprefixed OFDM symbol;
   adding a cyclic prefix to each un-prefixed OFDM symbol to form prefixed OFDM symbols;
   performing phase compensations forcing the un-prefixed OFDM symbol part of all prefixed OFDM symbols to start at the same phase after subsequent up-conversion to radio frequency;
   up-converting the phase compensated prefixed OFDM symbols to respective radio frequency bands having center frequencies and bandwidths that preserve the OFDM multi-carrier structure; and
   combining the up-converted phase compensated prefixed OFDM symbols into an OFDM signal.

2. The method of claim 1, wherein phase compensations are controlled by feedback signals from oscillators used for up-conversion.

3. The method of claim 1, wherein phase compensations are performed before the transforming step.

4. The method of claim 1, wherein phase compensations are performed between the transforming step and the up-converting step.

5. The method of claim 1, wherein the transforming step includes an inverse discrete Fourier transformation followed by an interpolation.

6. A method of forming a baseband signal from an OFDM signal, including the steps of:
   down-converting partially overlapping radio frequency bands of the OFDM signal to corresponding prefixed OFDM symbols;
   removing a cyclic prefix from each down-converted prefixed OFDM symbol to form un-prefixed OFDM symbols;
   transforming the unprefixed OFDM symbols into baseband sub-blocks mapped to adjacent OFDM sub-carrier blocks;
   de-mapping the baseband sub-blocks from the adjacent OFDM sub-carrier blocks;
   performing phase compensations after down-conversion so that the de-mapped baseband sub-blocks will correspond to unprefixed OFDM symbols that start at the same phase; and
   combining the phase compensated de-mapped baseband sub-blocks into a baseband signal.

7. The method of claim 6, wherein the OFDM signal is a pre-coded OFDM signal.

8. The method of claim 6, wherein phase compensations are controlled by feedback signals from oscillators used for down-conversion.

9. The method of claim 6, wherein phase compensations are performed between the down-converting step and the transforming step.

10. The method of claim 6, wherein phase compensations are performed after the transforming step.

11. The method of any of claim 6, wherein the transforming step includes a decimation followed by a discrete Fourier transformation.

12. A base station arrangement for forming an OFDM signal from a baseband signal, said base station comprising:
   a partitioning unit configured to partition a block of baseband signal samples into sub-blocks;
   a sub-carrier mapper configured to map the sub-blocks onto adjacent sub-carrier blocks of an OFDM multi-carrier;
   a plurality of transforming units configured to transform each mapped sub-block into a corresponding unprefixed OFDM symbol;
   a plurality of cyclic prefix adders configured to add a cyclic prefix to each mapped sub-block to form prefixed OFDM symbols;
   a plurality of phase compensators configured to perform phase compensations forcing the unprefixed OFDM symbol part of all prefixed OFDM symbols to start at the same phase after subsequent up-conversion to radio frequency;
   a plurality of up-converters configured to up-convert the phase compensated prefixed OFDM symbols to respective radio frequency bands having center frequencies and bandwidths that preserve the OFDM multi-carrier structure; and
   a combiner configured to combine the up-converted phase compensated prefixed OFDM symbols into an OFDM signal.

13. The base station arrangement of claim 12, wherein the phase compensations are controlled by feedback signals from oscillators used for up-conversion.

14. The base station arrangement of claim 12, wherein the phase compensators are located before the transforming units.

15. The base station arrangement of claim 12, wherein the phase compensators are located between the transforming units and the up-converters.

16. The base station arrangement of claim 12, wherein each transforming unit includes an inverse discrete Fourier transformer followed by an interpolator.

17. A base station arrangement for forming a baseband signal from an OFDM signal, said base station comprising:
   a plurality of down-converters configured to down-convert partially overlapping radio frequency bands of the OFDM signal to corresponding prefixed OFDM symbols;
   a plurality of cyclic prefix removers configured to remove a cyclic prefix from each down-converted prefixed OFDM symbol to form unprefixed OFDM symbols;
   a plurality of transforming units configured to transform the un-prefixed OFDM symbols into baseband sub-blocks mapped to adjacent OFDM sub-carrier blocks;
   a sub-carrier de-mapper configured to de-map the baseband sub-blocks from the adjacent OFDM sub-carrier blocks;
   a plurality of phase compensators configured to perform phase compensations after down-conversion so that the de-mapped baseband sub-blocks will correspond to un-prefixed OFDM symbols that start at the same phase; and
   a combiner configured to combine the phase compensated de-mapped baseband sub-blocks into a baseband signal.

18. The base station arrangement of claim 17, including an inverse discrete Fourier transform unit for post-processing the baseband signal.

19. The base station arrangement of claim 17, wherein the phase compensators are controlled by feedback signals from oscillators used for down-conversion.

20. The base station arrangement of claim 17, wherein the phase compensators are located between the down-converter and the transforming units.

21. The base station arrangement of claim 17, wherein the phase compensators are located after the transforming units.

22. The base station arrangement of claim 17, wherein each transforming unit includes a decimation followed by a discrete Fourier transformer.

\* \* \* \* \*

UNITED STATES PATENT AND TRADEMARK OFFICE
CERTIFICATE OF CORRECTION

PATENT NO. : 8,126,070 B2
APPLICATION NO. : 12/325501
DATED : February 28, 2012
INVENTOR(S) : Hyllander et al.

It is certified that error appears in the above-identified patent and that said Letters Patent is hereby corrected as shown below:

In Fig. 11, Sheet 8 of 18, for Tag "S5", in Line 2, delete "SYMOL" and insert -- SYMBOL --, therefor.

In Fig. 15, Sheet 12 of 18, for Tag "S14", in Line 2, delete "CARRFIER" and insert -- CARRIER --, therefor.

In Column 2, Line 16, delete "sub-Page" and insert -- sub- --, therefor.

In Column 2, Line 37, delete "DRAWING" and insert -- DRAWINGS --, therefor.

In Column 7, Line 58, delete "$f_{1C}K\ f\ '_{4C}$." and insert -- $f'_{1C}K\ f'_{4C}$. --, therefor.

In Column 14, Line 36, in Claim 11, delete "of any of" and insert -- of --, therefor.

Signed and Sealed this
Nineteenth Day of June, 2012

David J. Kappos
*Director of the United States Patent and Trademark Office*